(12) United States Patent
Hawkins et al.

(10) Patent No.: US 8,976,063 B1
(45) Date of Patent: Mar. 10, 2015

(54) AUTOMATED DETECTION OF VEHICLE PARKING AND LOCATION

(71) Applicant: Google Inc., Mountain View, CA (US)

(72) Inventors: Dale Kris Hawkins, Erie, CO (US);
Marc Stogaitis, San Mateo, CA (US);
Andrew Kirmse, Redwood City, CA (US); David James Hawkey, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/285,183

(22) Filed: May 22, 2014

Related U.S. Application Data

(60) Provisional application No. 61/985,891, filed on Apr. 29, 2014.

(51) Int. Cl.
*G01S 19/49* (2010.01)
*G01S 19/14* (2010.01)
*G01S 19/05* (2010.01)

(52) U.S. Cl.
CPC ............ *G01S 19/05* (2013.01); *G01S 19/14* (2013.01); *G01S 19/49* (2013.01)
USPC ................................. 342/357.32; 342/357.52

(58) Field of Classification Search
USPC .......................... 342/357.32, 357.52; 701/501
IPC ........ G01S 19/49,19/14; G01C 21/005, 21/165, G01C 21/206
See application file for complete search history.

(56) References Cited

U.S. PATENT DOCUMENTS

| | | | |
|---|---|---|---|
| 8,344,998 | B2 | 1/2013 | Fitzgerald et al. |
| 8,560,004 | B1 | 10/2013 | Tsvetkov et al. |
| 2006/0161377 | A1 | 7/2006 | Rakkola et al. |
| 2007/0010940 | A1* | 1/2007 | Tan et al. ...................... 701/207 |
| 2008/0234935 | A1 | 9/2008 | Wolf et al. |
| 2009/0278738 | A1* | 11/2009 | Gopinath ................. 342/357.12 |
| 2010/0235667 | A1 | 9/2010 | Mucignat et al. |
| 2011/0093729 | A1 | 4/2011 | Mucignat et al. |

(Continued)

FOREIGN PATENT DOCUMENTS

WO      2014035119 A2      3/2014

OTHER PUBLICATIONS

H. Abbott et al., Land-vehicle navigation using GPS, Proceedings of the IEEE, vol. 87(1), p. 145-162, 1999.*

(Continued)

*Primary Examiner* — Gregory C Issing
*Assistant Examiner* — Fred H Mull
(74) *Attorney, Agent, or Firm* — Shumaker & Sieffert, P.A.

(57) ABSTRACT

In one example, a method includes determining, based on first motion data, that a change in an angle of a mobile computing device relative to gravity satisfies a threshold amount of change, and, responsive to determining that the change in the angle satisfies the threshold amount of change, initiating, at a first position of the mobile computing device, storage of second motion data, wherein the first position is a reference position. The method may also include determining, based on an external signal, a second position of the mobile computing device, wherein the second position is a current position of the mobile computing device that is different from the reference position, and, responsive to determining the second position of the mobile computing device, determining, based on the second motion data and the current position, the reference position of the mobile computing device.

18 Claims, 5 Drawing Sheets

(56) References Cited

U.S. PATENT DOCUMENTS

| | | | |
|---|---|---|---|
| 2012/0254100 A1 | 10/2012 | Grokop et al. | |
| 2012/0287035 A1 | 11/2012 | Valko et al. | |
| 2012/0290252 A1 | 11/2012 | Abraham | |
| 2012/0297226 A1 | 11/2012 | Mucignat et al. | |
| 2014/0028477 A1* | 1/2014 | Michalske | 340/990 |
| 2014/0232569 A1 | 8/2014 | Skinder et al. | |
| 2014/0232570 A1 | 8/2014 | Skinder et al. | |

OTHER PUBLICATIONS

J.L. Weston et al., Modern inertial navigation technology and its application, Electronics & Communication Engineering Journal, vol. 12(2), p. 49-64, 2000.*

Beckler, "Accelerometer-Based Intertial Navigation," University of Minnesota Electrical and Computer Engineering Department, May 9, 2008, 17 pp.

Cochibo, "Arrow knows where you parked—Arrow Car Finder," Cochibo, 2012, retrieved from <http://cochibo.com/arrow/> 4 pp.

Cochibo, "Arrow knows where you parked—FAQ," Cochibo, 2012, retrieved from <http://cochibo.com/arrow/faq/> 2 pp.

Jophde, "Valet," Google Play, Apr. 3, 2014, retrieved from <https://play.google.com/store/apps/details?id=co.valetapp> 3 pp.

Mathie, "Monitoring and Interpreting Human Movement Patterns Using a Triaxial Accelerometer," The University of New South Wales—Faculty of Engineering, Aug. 2003, 512 pp.

Data Sheet "BMA 220 Digital, triaxial acceleration sensor," Bosch Sensortec, Document revision 1.15, Document release date Aug. 23, 2011, downloaded from http://ae-bst.resource.bosch.com/media/productsdokumente/bma220/bst-bma220-ds003-08.pdf, 63 pp.

Keyboadr, "Auto-Finder—Android Apps on Google Play," Feb. 24, 2014, retrieved from <http://play.google.com/store/apps/details?id=com.keyboardr.parkingwithglass> 3 pp.

Khan et al., "A Triaxial Accelerometer-Based Physical-Activity Recognition view Augmented-Signal Features and a Hierarchical Recognizer," IEEE Transactions on Information Technology in Biomedicine, vol. 14, No. 5, Sep. 2010, 7 pp.

Subramanya et al., "Recognizing Activities and Spatial Context Using Wearable Sensors," Proc. of Conference on Uncertainty in AI (UAI), 2006, 10 pp.

Khan, "Human Activity Recognition Using a Single Tri-axial Accelerometer," Kyung Hee University—Department of Computer Engineering, Feb. 2011, 160 pp.

Khan et al., "A Feature Extraction Method for Realtime Human Activity Recognition on Cell Phones," Proc of International Symposium on Quality of Life Technology, 2011, 6 pp.

Lee et al., "Activity and Location Recognition Using Wearable Sensors," Pervasive Computing, 2002, 9 pp.

Mannini et al., "Machine Learning Methods for Classifying Human Physical Activity from On-Body Accelerometers," MDPI—Open Access Sensors, Feb. 1, 2010, 22 pp.

* cited by examiner

US 8,976,063 B1

AUTOMATED DETECTION OF VEHICLE PARKING AND LOCATION

This application claims the benefit of U.S. Provisional Application No. 61/985,891, filed Apr. 29, 2014, the entire contents of which is hereby incorporated by reference.

BACKGROUND

Mobile computing devices provide the benefit of being portable while allowing a user to perform a variety of functions including various forms of communication and computing. For example, some mobile devices are capable of accessing the Internet, executing gaming applications, playing videos and music, as well as providing functionality of a traditional mobile, e.g. cellular, phone. Some such mobile computing devices may include a global positioning system (GPS) element, which may aid the computing device in determining a current location of the computing device. The GPS element may enable functionality of the mobile computing device, such as a parking reminder system.

A user may request that the mobile computing device store an indication of a current location of the mobile computing device as the location at which the user's vehicle is parked. However, when the GPS element is not able to lock onto a sufficient number of satellites (e.g., because the computing device is currently located in a parking garage, inside a building, near a building, etc.), the GPS element may not be able to provide sufficiently precise location information to the mobile computing device to enable the mobile computing device to precisely determine its current location. However, when the user moves away from the cause of the GPS signal interference such that the GPS element can determine the current location of the computing device, the subsequently determined location may not be near the location of the parked vehicle, which may result in an inaccurate location being marked as the location at which the vehicle is parked.

SUMMARY

In one example, a method includes determining, by a mobile computing device and based on first motion data generated by a motion sensor of the mobile computing device, that a change in an angle of the mobile computing device relative to gravity satisfies a threshold amount of change, and, responsive to determining that the change in the angle satisfies the threshold amount of change, initiating, at a first position of the mobile computing device, storage of second motion data generated by the motion sensor, wherein the first position is a reference position. In some examples, the method may also include determining, by the mobile computing device and based on an external signal, a second position of the mobile computing device, wherein the second position is a current position of the mobile computing device that is different from the reference position, and, responsive to determining the second position of the mobile computing device, determining, by the mobile computing device, based on the second motion data and the current position, the reference position of the mobile computing device.

In another example, a computing device includes one or more processors, a motion sensor, a motion module, a parking module, and a positioning system. In this example, the motion module determines, based on the first motion data generated by the motion sensor, that a change in an angle of the mobile computing device relative to gravity satisfies a threshold amount of change, and, responsive to determining that the change in the angle satisfies the threshold amount of change, initiates, at a first position of the mobile computing device, storage of second motion data generated by the motion sensor, wherein the first position is a reference position. Also in this example, the positioning system determines, based on an external signal, a second position of the mobile computing device, wherein the second position is a current position of the mobile computing device that is different from the reference position. Further, in this example, the parking module is operable by the one or more processors to, responsive to determining the second position of the mobile computing device, determine, based on the second motion data and the current position, the reference position of the mobile computing device.

In another example, a non-transitory computer-readable storage medium encoded with instructions that, when executed, cause at least one processor of a mobile computing device to determine, based on first motion data generated by a motion sensor of the mobile computing device, that a change in an angle of the mobile computing device relative to gravity satisfies a threshold amount of change, and, responsive to determining that the change in the angle satisfies the threshold amount of change, initiate, at a first position of the mobile computing device, storage of second motion data generated by the motion sensor, wherein the first position is a reference position. The instructions may further cause the at least one processor of the mobile computing device to determine, based on an external signal, a second position of the mobile computing device, wherein the second position is a current position of the mobile computing device that is different from the reference position, and, responsive to determining the second position of the mobile computing device, determine, based on the second motion data and the current position, the reference position of the mobile computing device.

The details of one or more examples of the disclosure are set forth in the accompanying drawings and the description below. Other features, objects, and advantages will be apparent from the description and drawings, and from the claims.

DETAILED DESCRIPTION

Figure 1:
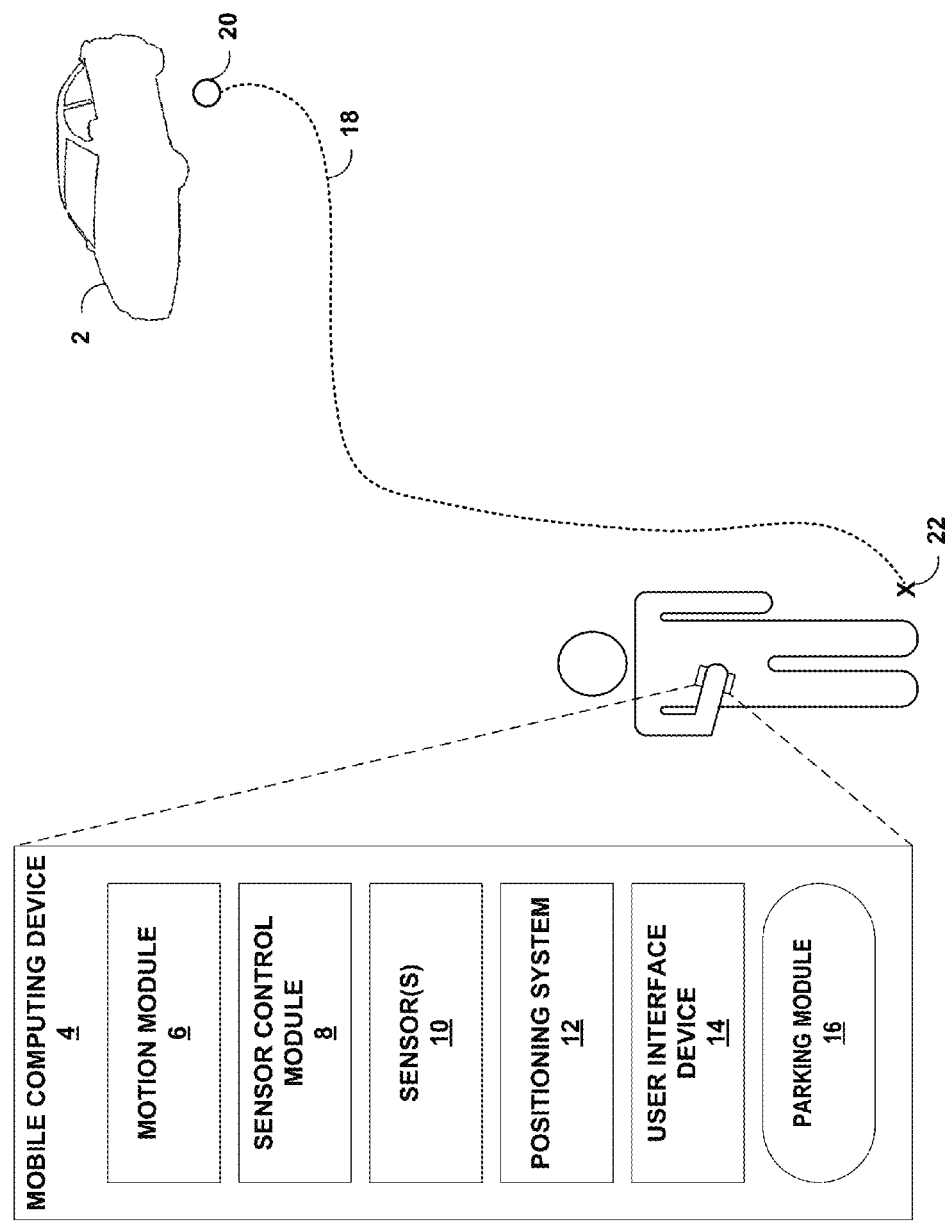
FIG. 1 is a block diagram illustrating an example computing device that is configured to automatically determine a previous location based on motion data, in accordance with one or more techniques of the present disclosure.

In general, techniques of the disclosure are directed to a computing device that determines, based on motion data, a location at which the computing device detected a transition between different physical activities of a user associated with the computing device. For instance, the computing device may determine that the user associated with the computing device is in a vehicle that is in motion (e.g., based on a first set of motion data). Responsive to a motion module of the computing device determining that the angle of the computing device relative to gravity (i.e., the tilt of the computing device) has changed by at least a threshold amount, the motion module of the computing device may cause a processor included in the computing device to determine whether the user has transitioned between activities by, for example, comparing the determined current activity (e.g., walking) to an activity in which the user was engaged as determined by the computing device prior to detection of the tilt event (e.g., riding in a vehicle). Responsive to determining that the user transitioned from riding in a vehicle to traveling by foot, the computing device may activate one or more elements of a positioning system (e.g., a GPS module) and may initiate storage of motion data being generated by the motion module. In some instances, the positioning system may not be able to determine a current location of the computing device for some period of time (e.g., one second, ten seconds, thirty seconds, two minutes, five minutes, etc.). Responsive to the positioning system determining the current location of the computing device and, in some instances, a heading of the computing device, the computing device may analyze the stored motion data to determine the location of the computing device at the time the user transitioned between physical activities, and may accordingly label the determined location as the location at which the user exited the vehicle (i.e., where the vehicle is likely parked).

Continuously collecting and analyzing motion data to determine transitions between physical activities associated with a user may consume a significant quantity of power (e.g., power stored in a battery of a computing device). Moreover, positioning systems of the computing device may also consume a significant quantity of power and may not be able to receive external signals due to various sources of interference, such as buildings, trees, etc., which may reduce the accuracy of the position or location associated with the detected activity transition. Therefore, rather than continuously powering the positioning system or accepting a lower accuracy location associated with the detected activity transition, techniques of the disclosure may be used to activate a sensor, a processor, and/or, in some instances, a positioning system of the computing device responsive to a preliminary determination of a change in the angle of the computing device by a lower-power consuming motion module. Moreover, collection of motion data may be accomplished without the positioning system being able to determine a current position of the computing device and the motion data may be used to determine a previous (i.e., earlier in time) position of the computing device once the positioning system is able to determine the current position of the computing device.

In this way, as opposed to operating relatively higher power-consuming devices and being unable to determine a position (e.g., location) at which the computing device determined that the user transitioned between activities, the computing device may activate the processor and positioning system while storing motion data generated by the relatively lower-power motion module based on an initial determination by the lower-power consuming motion module. Moreover, while in a low-power mode, the motion module may continuously monitor the angle of the computing device without collecting and analyzing full motion data for the mobile computing device, and may activate the positioning system while collecting motion data that, once the positioning system is able to determine a current location of the computing device, can be used to determine the location at which the activity transition occurred. By using such motion data in combination with a positioning, system, techniques of this disclosure may enable a computing device to more accurately determine a location at which the computing device detected an activity transition.

FIG. 1 is a block diagram illustrating an example computing device that is configured to automatically determine a previous location based on motion data, in accordance with one or more techniques of the present disclosure. As shown in the example of FIG. 1, mobile computing device 4 may include motion module 6, sensor control module 8 ("SCM 8"), one or more sensors 10, positioning system 12, user interface device 14 ("UID 14"), and parking module 16.

Mobile computing device 4 may include any number of different portable electronic computing devices, including, e.g., cellular phones, personal digital assistants (PDAs), laptop computers, portable gaming devices, portable media players, e-book readers, watches. Mobile computing device 4 may include various input and output components, including, e.g. one or more processors, memory, telemetry modules, cellular network antennas, a display, one or more UI elements, sensors, and a power source like a rechargeable battery. Further details of mobile computing device 4 are described in FIG. 2. Other examples of mobile computing device 4 that implement techniques of this disclosure may include additional components not shown in FIG. 1.

In some examples, mobile computing device 4 may include motion module 6. Motion module 6 may collect and analyze motion data corresponding to the movement of mobile computing device 4. For instance, motion module 6 may determine whether or not mobile computing device 4 has moved. In some examples, motion module 6 may determine whether or not mobile computing device 4 has moved by analyzing motion data received from a motion sensor included in motion module 6. In other words and as further illustrated in FIG. 2, motion module 6 may include a motion sensor to measure motion data (e.g., a motion sensor of sensors 10) and a processor to analyze the measured motion data. In some examples, motion module 6 may be a low power device. For instance, motion module 6 may use less power than sensor control module 8 and/or application processors (e.g., application processors 42 of FIG. 2). As one example, in operation, motion module 6 may use approximately 0.1 milliwatts (mW). In another example, motion module 6 may use power in a range of 0.01-3.0 mW. In some examples, motion module 6 may output a signal to one or more other components of mobile computing device 4 in response to determining that mobile computing device 4 has moved (e.g., that an angle of mobile computing device 4 relative to gravity has changed at least a threshold amount). For instance, motion module 6 may output an interrupt signal to SCM 8 in response to determining that mobile computing device 4 has moved.

In some examples, mobile computing device 4 may include SCM 8. SCM 8 may communicate with one or more of sensors 10, positioning system 12, and/or motion module 6. In some examples, SCM 8 may be referred to as a "sensor hub" that operates as an input/output controller for one or more of sensors 10, positioning system 12, and/or motion module 6. For example, SCM 8 may exchange data with one or more of sensors 10, positioning system 12, and/or motion module 6, such as motion data and/or location data corresponding to mobile computing device 4. In some examples, SCM 8 may control the power state of one or more of sensors 10 and positioning system 12. For instance, SCM 8 may switch one or more of sensors 10 between an on power state and an off power state where more power is consumed by the one or more sensors 10 in the on power state than in the off power state. In this way, SCM 8 may control the amount of power consumed by one or more of sensors 10 and positioning system 12. SCM 8 may also communicate with application processors. In some examples, SCM 8 may use more power than motion module 6 but less power than the application processors. As one example, in operation, SCM 8 may use power in a range of 20-200 mW.

SCM 8 may analyze data received from motion module 6 and/or one or more of sensors 10. SCM 8 may determine that a change in an angle of mobile computing device 4 relative to gravity satisifies a threshold amount of change based on motion data measured by one or more of sensors 10. That is, SCM 8 may determine a statistic based on the motion data. If the statistic satisfies a threshold, SCM 8 may determine that the tilt of mobile computing device 4 indicates a possible transition in a current activity of the user. Responsive to determining that the change in the angle of mobile computing device 4 relative to gravity satisfies a threshold amount of change, SCM 8 may cause application processors and/or positioning system 12 to transition from a low power state to a relatively higher power state.

In some examples, SCM 8 may receive one or more interrupt signals, for example, from motion module 6. In response to receiving an interrupt signal, SCM 8 may cause the applications processors and position system 12 to transition from a low-power or "sleep" state into one or more higher power states. The application processors and positioning system 12 may consume less power in the low-power state than in the higher power states.

In some examples, mobile computing device 4 may include one or more sensors 10. One or more of sensors 10 may measure one more measurands. Examples of one or more of sensors 10 may include an accelerometer, a gyroscope, a light sensor, a temperature sensor, a pressure (or grip) sensor, a physical switch, a proximity sensor, a global positioning system sensor or a button.

Positioning system 12 may determine a current location of mobile computing device 4 and a current time. For example, positioning system may include a global positioning system (GPS) sensor (i.e., a GPS radio) for receiving GPS signals (e.g., from a GPS satellite) having data corresponding to the current time and the current location of mobile computing device 4. Positioning system 12 may analyze the GPS signals received by the GPS radio and determine the current location of mobile computing device 4 and the current time. Mobile computing device 4 may include other radios or sensor devices (e.g., cellular radio, Wi-Fi radio, etc.) capable of receiving signal data, which positioning system 12 can use to determine the current location of mobile computing device 4 and the current time.

In some examples, positioning system 12 may determine a relative location and/or perform location multilateration to determine a current location (e.g., a technique for determining a single location based on relative position data received from two or more signals). In some examples, positioning system 12 may determine location data as coordinate (e.g., GPS) location data. In other examples, positioning system 12 may determine location data as one or more general or relative locations, such as an address, a place, a country, a city, a type of building (e.g., a library, an airport, etc.), a business, etc.

In some examples, positioning system 12 may obtain the current location of mobile computing device 4 and/or the current time a remote server via a network. In response to a Wi-Fi network identifier received from mobile computing device 4, the remote server may send location information of mobile computing device 4 to positioning system 12. Positioning system 12 may output location and time data to other modules of mobile computing device 4, such as parking module 16.

As used throughout this disclosure, the phrase "current location" refers to a location at a particular time. In various instances, mobile computing device 4 may have physically moved to a different geographic location between the time at which the current location was first determined and the present moment. Even so, the "current location" of mobile computing device 4 is determined to be the location at which the device was physically located at the moment that the location was last determined. The same "current location" may be used throughout the prediction process even though updated current locations may be determined during the prediction process. In general, a "current location" of mobile computing device 4 may be any location within a threshold distance (e.g., 1 meter, 5 meters, 10 meters, 100 meters, 500 meters, etc.) surrounding the determined current location. Similarly, the phrase "current time" refers to a particular time at which mobile computing device 4 determined the "current time" and may be the same time used throughout the prediction process even though the literal current time may change by fractions of a second, a second, or some other amount during the prediction process.

In some examples, mobile computing device 4 may include UID 14. A user associated with mobile computing device 4 may interact with mobile computing device 4 by providing various user inputs into mobile computing device 4, e.g., using the at least one UID 14. In some examples, UID 14 may receive tactile, audio, or visual input. In addition to receiving input from a user, UID 14 may output content, such as a graphical user interface (GUI) for display. In some examples, UID 14 can include a display and/or a presence-sensitive input device. In some examples, the presence-sensitive input device and the display may be integrated into a presence-sensitive display, which displays the GUI and receives input from the user using capacitive, inductive, surface acoustic wave, and/or optical detection at or near the presence sensitive display. That is, UID 14, in some examples may be a presence-sensitive display. In other examples, the display device can be physically separate from a presence-sensitive device included in mobile computing device 4.

In some examples according to this disclosure, the terms "vertical" and "horizontal" correspond to orientations that are treated as generally parallel to gravity and perpendicular to the ground and generally perpendicular to gravity and parallel to the ground, respectively. However, in practice, the orientation of mobile computing device 4 may not be exactly or nearly exactly vertical or horizontal. Thus, the description provided below illustrates how the orientation of a computing device may be determined with one or more motion sensors when the computing device is only approximately vertical or horizontal by employing a range of orientations within which the computing device's orientation vector as determined by the motion sensor may lie to designate the computing device in a particular orientation.

Rather than configuring positioning system 12 to regularly (e.g., periodically, continuously, etc.) monitor external signals (e.g., GPS signals) and regularly determine a current location of mobile computing device 4, techniques of this disclosure may enable mobile computing device 4 to continuously monitor an angle of mobile computing device 4 using motion module 6 and cause positioning system 12 to transition to the higher-power mode and determine a current location of mobile computing device 4 in response to determining that the change in the angle of mobile computing device 4 relative to gravity satisfies a threshold amount of change (e.g., a change of 15 degrees, 20 degrees, 25 degrees, 30 degrees, 35 degrees, 40 degrees, etc. in the angle of mobile computing device 4 relative to gravity). For instance, mobile computing device 4 may determine that the user is likely riding in car 2 (e.g., based on detection motion data).

At a first time, mobile computing device 4 may be in a first orientation, such as horizontal (e.g., located in a user's pocket while the user is sitting down). At the first time, mobile computing device 4 may be in a low-power state in which one or more components of mobile computing device 4 may be off, deactivated, sleeping, have limited functionality, etc. For instance, at the first time, UID 14 may be deactivated, one or more of sensors 10 and positioning system 12 may be powered off, and SCM 8 may be sleeping. In this way, mobile computing device 4 may consume a reduced amount of power in the low-power state when compared to a normal operating state.

Motion module 6 may generate motion data while mobile computing device 4 is in the reduced power state. In some examples, motion module 6 may provide the motion data to SCM 8 that, in turn, may analyze the motion data and determine that a user of mobile computing device 4 is riding in car 2. The user may change the angle of mobile computing device 4 by, for example, standing up. For instance, when mobile computing device 4 is stored in a pocket of the user, the user may move mobile computing device 4 from a first (e.g., horizontal) to a second orientation (e.g., vertical) by standing up. Motion module 6 may determine, based on motion data measured by a motion sensor of sensors 10, that the angle of mobile computing device 4 relative to gravity has changed. In other words, motion module 6 may determine that mobile computing device 4 has moved in response to simple motion. In response to determining that mobile computing device 4 has moved from the first orientation to the second orientation, motion module 6 may output a signal (e.g., an interrupt signal) to SCM 8 and/or positioning system 12.

Responsive to receiving the signal from motion module 6, SCM 8 and/or positioning system 12 may transition from a low-power state to a higher-power state. In other words, after receiving the signal from motion module 6, SCM 8 and/or positioning system 12 may begin to consume power at a higher rate than before receiving the signal.

In some examples, SCM 8 may also cause one or more application processors to transition from a low-power state to a higher-power state. The application processors may determine whether the user of mobile computing device 4 is transitioning between activities. Responsive to transitioning to the higher-power state, the application processors may receive motion data for a period of time. In some examples, the period of time may be one second, three seconds, ten seconds, etc. The one or more of sensors 10 (e.g., an accelerometer) may generate the motion data during the time period. The application processors may analyze the motion data to determine a current activity of the user. For instance, the motion data may indicate that the user is walking, running, skipping, or otherwise traveling by foot.

The application processors may determine the current activity in many different ways. As one example, the application processors may analyze a series of data points generated by motion module 6. Motion module 6 may generate the data points over a single period of time (e.g., a three second period) or over two or more noncontiguous periods of time. In general, the data points correspond to motion of mobile computing device 4. The activity determination process may compare the pattern of movement indicated by the data points to one or more template patterns for each different type of activity. That is, in determining the activity, the application processors may classify the series of data points as being associated with the particular activity.

The application processors may compare the determined current activity of the user to a previously determined activity of the user (e.g., determined prior to motion module 6 determining that a change in the angle of mobile computing device 4 satisfied a threshold amount of change). In general, mobile computing device 4 is physically located at a particular position at the time that the change in the angle of mobile computing device 4 satisfies the threshold amount of change (e.g., location 20 of FIG. 1).

In various instances, mobile computing device 4 may be configured to include tilt detection into an activity transition model, such as a hidden Markov model. For instance, the activity transition model may include the probability of a user going from being in a car versus being on foot and the probabilities of determining a particular activity based on a previously determined activity. For example, mobile computing device 4 may be configured with a high probability of a user going from on foot to entering a vehicle and to being in a vehicle to exiting a vehicle, while having a low probability of doing directly from being in the vehicle to being on a bicycle. We would then assign a high probability to detecting a tilt (i.e., a change in the angle of mobile computing device 4 that satisfies the threshold amount of change) when mobile computing device 4 determines that the user is entering or exiting a vehicle.

If the application processors determine that the current activity is different than the previously determined activity (e.g., that the current activity is walking or otherwise traveling by foot and the previously determined activity is riding in a car), the application processors may cause mobile computing device 4 to perform an action. For example, the application processors may cause mobile computing device 4 to initiate storage of motion data generated by motion module 6. As another example, the application processors may cause positioning system 12 to initiate a current location determination process.

From time to time, positioning system 12 may be unable to determine the current location of computing device 4 in a timely manner (e.g., within two seconds, five second, thirty seconds, one minute, etc.). Positioning system 12 may be unable to determine the current location because one of sensors 10, such as a global positioning system sensor, is unable to receive an external signal, such as from one or more GPS satellites, required for positioning system 12 to determine the current location of mobile computing device 4. While positioning system 12 is attempting to determine a current location of mobile computing device 4, the user associated with mobile computing device 4 may have traveled from location 20 to location 22 (e.g., along path 18). The difference in position from location 20 to location 22 may be a few feet or it may be hundreds of feet, depending how long it takes positioning system 12 to determine the current location of mobile computing device 4 and how fast the user is traveling.

In instances where mobile computing device 4 determines that the current activity of the user of mobile computing device 4 transitioned from riding in a vehicle (e.g., car 2) to walking or otherwise traveling by foot (e.g., along path 18), mobile computing device 4 may be configured to mark the current location of mobile computing device 4 as the location at which the user exited car 2 (i.e., where car 2 is parked). Thus, if the difference in position between location 20 and 22 is sufficiently large (e.g., at least thirty feet, at least one hundred feet, at least three hundred feet, etc.), the stored location associated with the position of car 2 may be too inaccurate for the user of mobile computing device 4 to easily location car 2 at a later time. As such, it may be important to determine the position (e.g., location) of mobile computing device 4 at the time mobile computing device 4 determined that the change in the angle of mobile computing device 4 satisfied the threshold amount of change with more precision than may be available if relying upon positioning system 12.

In accordance with techniques of this disclosure, parking module 16 analyzes stored motion data to determine a previously (i.e., earlier in time) location of mobile computing device 4. Responsive to mobile computing device 4 determining the change in the angle of mobile computing device 4 satisfies the threshold amount of change, motion module 6 initiates storage of motion data generated by a motion sensor (e.g., a motion sensor of motion module 6, a motion sensor of sensors 10, etc.). Responsive to positioning system 12 determining a current location of mobile computing device 4 (e.g., location 22), parking module 16 analyzes the motion data stored while the user traveled along path 18 from location 20 to location 22. Based on this stored motion data, parking module 16 determines the position of location 20 (e.g., coordinate (e.g., GPS) location data, an address, a place, a business, level or floor of a parking ramp, etc.). That is, mobile computing device 4 may not be able to ascertain the position of mobile at the time mobile computing device 4 determines that the change in the angle relative to gravity satisfies the threshold amount of change. However, techniques of this disclosure may enable mobile computing device 4 to use motion data in combination with a known current location to determine the location of mobile computing device 4 at the time mobile computing device 4 previously determined that the change in the angle relative to gravity satisfied the threshold amount of change.

Figure 2:
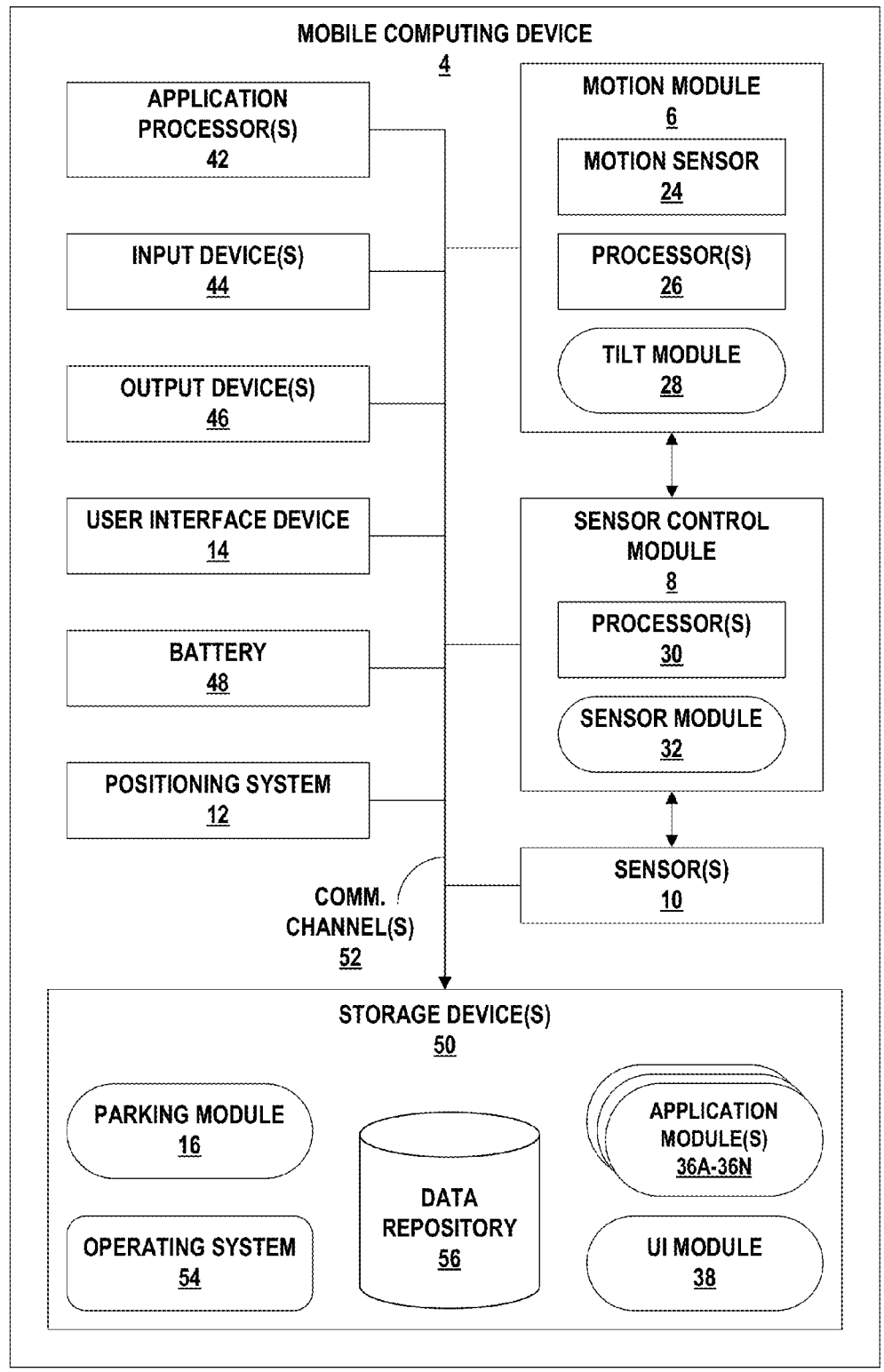
FIG. 2 is a block diagram illustrating an example computing device, in accordance with one or more techniques of the present disclosure.

FIG. 2 is a block diagram illustrating an example computing device, in accordance with one or more techniques of the present disclosure. FIG. 2 illustrates one particular example of mobile computing device 4, and many other examples of mobile computing device 4 may be used in other instances and may include a subset of the components included in example mobile computing device 4 or may include additional components not shown in FIG. 2.

As shown in the example of FIG. 2, mobile computing device 4 includes motion module 6, sensor control module 8 ("SCM 8"), one or more sensors 10, positioning system 12, user interface device 14 ("UID 14"), one or more application processors 42, one or more input devices 44, one or more output devices 46, battery 48, and one or more storage devices 50. Storage devices 50 of mobile computing device 4 may include parking module 16, application modules 36A-36N (collectively, "application modules 36"), user interface module 38 ("UIM 38"), operating system 54, and data store 56. Mobile computing device 4 can include additional components that, for clarity, are not shown in FIG. 2. For example, mobile computing device 4 can include a communication unit to enable mobile computing device 4 to communicate with other devices. Similarly, the components of mobile computing device 4 shown in FIG. 2 may not be necessary in every example of mobile computing device 4. For example, in some configurations, mobile computing device 4 may not include output devices 46.

Communication channels 52 may interconnect each of the components 6, 8, 10, 12, 14, 42, 44, 46, 48, and 50 for inter-component communications (physically, communicatively, and/or operatively). In some examples, communication channels 52 may include a system bus, a network connection, an inter-process communication data structure, or any other method and/or structure for communicating data.

One or more application processors 42 may implement functionality and/or execute instructions within mobile computing device 4. For example, application processors 42 on mobile computing device 4 may receive and execute instructions stored by storage devices 50 that execute the functionality of modules 16, 36, 38, and 54. These instructions executed by application processors 42 may cause mobile computing device 4 to read/write/etc. information, such as one or more data files stored within storage devices 50 during program execution. Application processors 42 may execute instructions of modules 16, 36, 38, and 50 to cause UID 14 to output one or more graphical indications of incoming communications for display at UID 14 as content of a user interface. That is, parking module 16, application modules 36, UIM 38, and operating system 54 may be operable by application processors 14 to perform various actions or functions of mobile computing device 4, for instance, causing UID 14 to a present a graphical user interface at UID 14.

One or more input devices 44 of mobile computing device 4 may receive input. Examples of input are tactile, audio, and video input. One or more of input devices 44 of mobile computing device 4, in one example, may include a presence-sensitive display, touch-sensitive screen, mouse, keyboard, voice responsive system, video camera, microphone, or any other type of device for detecting input from a human or machine.

One or more output devices 46 of mobile computing device 4 may generate output. Examples of output are tactile, audio, and video output. One or more of output devices 46 of mobile computing device 4, in one example, may include a presence-sensitive display, sound card, video graphics adapter card, speaker, cathode ray tube (CRT) monitor, liquid crystal display (LCD), or any other type of device for generating output to a human or machine.

In some examples, UID 14 of mobile computing device 4 may include functionality of input devices 44 and/or output devices 46. In the example of FIG. 2, UID 14 may be a presence-sensitive display. In some examples, a presence-sensitive display may include a presence sensitive input device that detects an object at and/or near a screen. As one example range, a presence-sensitive input device may detect an object, such as a finger or stylus that is within two inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive display also includes an output device that provides output to a user using tactile, audio, or video stimuli (e.g., the output device may be a display device) as described with respect to output device 46, e.g., at a display. In the example of FIG. 2, UID 14 may present one or more graphical user interfaces.

While illustrated as an internal component of mobile computing device 4, UID 14 also represents an external component that shares a data path with mobile computing device 4 for transmitting and/or receiving input and output. For instance, in one example, UID 14 represents a built-in component of mobile computing device 4 located within and physically connected to the external packaging of mobile computing device 4 (e.g., a screen on a mobile phone). In another example, UID 14 represents an external component of mobile computing device 4 located outside and physically separated from the packaging of mobile computing device 4

(e.g., a monitor, a projector, etc. that shares a wired and/or wireless data path with a tablet computer).

Motion module 6 may collect and analyze motion data corresponding to the movement of mobile computing device 4. For instance, motion module 6 may determine whether or not mobile computing device 4 has moved. As illustrated in FIG. 2, motion module 6 may include motion sensor 24, one or more processors 26, and tilt module 28. In some examples, motion module 6 may be a discrete component within mobile computing device 4. In some examples, motion module 6 may be integrated into one or more other components of mobile computing device 4, such as sensor control module 8. In some examples, motion module 6 may include additional components that, for simplicity, are not shown in FIG. 2. For instance, motion module 6 may include one or more analog-to-digital converters which may facilitate communication between motion sensor 24 and one or more of processors 26. Additionally, motion module 6 may include one or more storage devices which may store tilt module 28.

Motion sensor 24 may measure motion information associated with mobile computing device 4. For instance, motion sensor 24 may measure the rotation, velocity, and/or acceleration of mobile computing device 4. Examples of one or more of motion sensor 24 may include an accelerometer, a gyroscope, or any other device capable of measuring the rotation, velocity, and/or acceleration of mobile computing device 4. Motion sensor 24 may output measured motion data to one or more components of mobile computing device 4, such as one or more of processors 26 and/or SCM 8.

Processors 26 may implement functionality and/or execute instructions within motion module 6. For example, one or more of processors 26 may receive and execute instructions stored by a storage device that execute the functionality of tilt module 28. These instructions executed by one or more of processors 26 may cause motion module 6 to read/write/etc. information, such as one or more data files stored within a storage device during program execution. Examples of one or more of processors 26 may include one or more microprocessors, digital signal processors (DSPs), application specific integrated circuits (ASICs), field programmable gate arrays (FPGAs), or any other equivalent integrated or discrete logic circuitry, as well as any combinations of such components.

Tilt module 28 may be executable by one or more of processors 26 to analyze motion data measured by motion sensor 24. For instance, tilt module 28 may determine that a change in an angle of mobile computing device 4 relative to gravity satisfies a threshold amount of change based on motion data measured by motion sensor 24. That is tilt module 28 may determine when the change in the angle of mobile computing device 4 is sufficient to be classified as a tilt event. Tilt module 28 may output a signal to one or more other components of mobile computing device 4 in response to determining that mobile computing device 4 has tilted. For instance, tilt module 28 may output an interrupt signal to SCM 8 in response to determining that mobile computing device 4 has tilted.

SCM 8 may collect and analyze sensor data. For instance, SCM 8 may collect any analyze sensor data from one or more of sensors 10 and/or motion sensor 24. As illustrated in FIG. 2, SCM 8 may include one or more processors 30, and sensor module 32. In some examples, SCM 8 may be a discrete component within mobile computing device 4. In some examples, SCM 8 may be integrated into one or more other components of mobile computing device 4, such as one or more of application processors 14. In some examples, SCM 8 may include additional components that, for simplicity, are not shown in FIG. 2. For instance, SCM 8 may include one or more analog-to-digital converters which may facilitate communication between one or more of sensors 10 and one or more of processors 30. Additionally, SCM 8 may include one or more storage devices which may store sensor module 32.

Processors 30 may implement functionality and/or execute instructions within SCM 8. For example, one or more of processors 30 may receive and execute instructions stored by a storage device that execute the functionality of sensor module 32. These instructions executed by one or more of processors 30 may cause SCM 8 to read/write/etc. information, such as one or more data files stored within a storage device during program execution.

SCM 8 may receive one or more interrupt signals. In response to receiving an interrupt signal, SCM 8 may transition from a low-power or "sleep" state into one or more higher power states. SCM 8 may consume less power in the low-power state than in the higher power states. For instance, SCM 8 may consume 0.1 mW of power in the low-power state, and between 20 mW and 200 mW of power in the higher power states. In some examples, in response to receiving an interrupt signal, one or more of processors 30 may execute sensor module 32.

Sensor module 32 may be executable by one or more of processors 30 to analyze sensor data measured by one or more of sensors 10 and/or motion sensor 24. For instance, sensor module 32 may determine one or more statistics based on sensor data measured by one or more of sensors 10 and/or motion sensor 24. If at least one of the statistics satisfies a threshold, sensor module 32 may determine that mobile computing device 4 has tilted (i.e., the change in the angle of mobile computing device 4 satisfies a threshold amount of change). Sensor module 32 may output a signal to one or more other components of mobile computing device 4 (e.g., in response to determining that mobile computing device 4 has tiled). For instance, sensor module 32 may output a signal to one or more components of mobile computing device 4 that causes one or more application processors 42 to peform a user activity determination process. As another example, sensor module 32 may output a signal to one or more components of mobile computing device 4 that causes position system 12 to intiate a location determination process to determine a current location of mobile computing device 4.

Positioning system 12 may determine a current location of mobile computing device 4 and a current time. For example, positioning system may include a global positioning system (GPS) sensor (i.e., a GPS radio) for receiving GPS signals (e.g., from a GPS satellite) having data corresponding to the current time and the current location of mobile computing device 4. Positioning system 12 may analyze the GPS signals received by the GPS radio and determine the current location of mobile computing device 4 and the current time. Mobile computing device 4 may include other radios or sensor devices (e.g., cellular radio, Wi-Fi radio, etc.) capable of receiving signal data, which positioning system 12 can use to determine the current location of mobile computing device 4 and the current time.

In some examples, positioning system 12 may determine a relative location and/or perform location multilateration to determine a current location (e.g., a technique for determining a single location based on relative position data received from two or more signals). In some examples, positioning system 12 may determine location data as coordinate (e.g., GPS) location data. In other examples, positioning system 12 may determine location data as one or more general or relative locations, such as an address, a place, a country, a city, a type of building (e.g., a library, an airport, etc.), a business, etc.

In some examples, positioning system 12 may obtain the current location of mobile computing device 4 and/or the current time via a remote server via a network. In response to a Wi-Fi network identifier received from mobile computing device 4, the remote server may send location information of mobile computing device 4 to positioning system 12. Positioning system 12 may output location and time data to other modules of mobile computing device 4, such as parking module 16.

Sensors 10 may collect information associated with mobile computing device 4. For instance, one or more of sensors 10 may measure the geographical location, object clearance, rotation, velocity, and/or acceleration of mobile computing device 4. Examples of one or more of sensors 10 may include an accelerometer, a gyroscope, a global positioning system sensor, a light sensor, a temperature sensor, a pressure (or grip) sensor, a physical switch, a proximity sensor, or a button. In some examples, one or more of sensors 10 may include one or more processors. For instance, one or more of sensors 10 may include one or more microprocessors, digital signal processors (DSPs), application specific integrated circuits (ASICs), field programmable gate arrays (FPGAs), or any other equivalent integrated or discrete logic circuitry, as well as any combinations of such components.

One or more storage devices 50 within mobile computing device 4 may store information for processing during operation of mobile computing device 4 (e.g., mobile computing device 4 may store data that modules 16, 36, and 38 and operating system 54 may access during execution at mobile computing device 4). In some examples, storage device 50 is a temporary memory, meaning that a primary purpose of storage device 50 is not long-term storage. Storage devices 50 on mobile computing device 4 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 50, in some examples, also include one or more computer-readable storage media. Storage devices 50 may store larger amounts of information than volatile memory. Storage devices 50 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 50 may store program instructions and/or information (e.g., data) associated with any combination of parking module 16, application modules 36, UIM 38, and operating system 54.

Storage device 50 may include data store 56. Data store 56 may represent any suitable storage medium for storing data. For example, data store 56 may store motion data generated by motion module 6 or one of sensors 10. Data store 56 may store motion data in any suitable data structure, such as a list, array, map, relational database, tree, etc.

Operating system 54, in some examples, controls the operation of components of mobile computing device 4. For example, operating system 54, in one example, facilitates the communication of parking module 16 and application modules 36 with application processors 14, one or more input devices 44, one or more output devices 46, UID 14, one or more sensors 10, motion module 6, and sensor control module 8. Each of application modules 36 may include program instructions and/or data that are executable by mobile computing device 4 (e.g., by one or more application processors 14).

UIM 38 may cause UID 14 to output a graphical user interface (e.g., graphical user interfaces 20, 24) for display, which may enable a user of mobile computing device 4 to view output and/or provide input at UID 14. UIM 38 and UID 14 may receive one or more indications of input from a user as the user interacts with the graphical user interface, at different times and when the user and mobile computing device 4 are at different locations. UIM 38 and UID 14 may interpret inputs detected at UID 14 (e.g., as a user provides one or more gestures at one or more locations of UID 14 at which the graphical user interface is displayed) and may relay information about the inputs detected at UID 14 to one or more associated platforms, operating systems, applications, and/or services executing at mobile computing device 4, to cause mobile computing device 4 to perform functions.

UIM 38 may receive information and instructions from one or more associated platforms, operating systems, applications, and/or services executing at mobile computing device 4 (e.g., application modules 36) for generating a graphical user interface. In addition, UIM 38 may act as an intermediary between the one or more associated platforms, operating systems, applications, and/or services executing at mobile computing device 4 and various output devices of mobile computing device 4 (e.g., speakers, LED indicators, audio or electrostatic haptic output device, etc.) to produce output (e.g., a graphic, a flash of light, a sound, a haptic response, etc.) with mobile computing device 4.

Battery 48 may provide power to one or more components of mobile computing device 4. Examples of battery 48 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. Battery 48 may have a limited capacity (e.g., 1000-3000 mAh).

Modules 16, 28, 32, 36, and 38 may perform operations described herein using software, hardware, firmware, or any combination of hardware, software, and firmware residing in and executing on mobile computing device 4. Computing device 4 may execute modules 16, 28, 32, 36, and 38 with multiple processors. Computing device 4 may execute any of modules 16, 28, 32, 36, and 38 as or within a virtual machine executing on underlying hardware. Modules 16, 28, 32, 36, and 38 may be implemented in various ways. For example, any of modules 16, 28, 32, 36, and 38 may be implemented as a downloadable or pre-installed application or "app." In another example, any of modules 16, 28, 32, 36, and 38 may be implemented as part of an operating system of mobile computing device 4.

Due to positioning system 12 occasionally being unable to determine the current location of computing device 4 in a timely manner, the accuracy of the determined position of mobile computing device 4 at the time of the activity transition may be reduced. That is, the delay in positioning system 12 determining the current location of mobile computing device 4 may result in a difference in the position from wherein an activity transition occurred (e.g., location 20 of FIG. 1) and the location at which positioning system 12 determines the current location of mobile computing device 4 (e.g., location 22 of FIG. 1). In applications, such as an automatic parking location application, the reduced accuracy may result in an unacceptable user experience.

In accordance with one or more techniques of this disclosure, rather than relying solely upon positioning system 12 for determining the location at which mobile computing device determined that the change in the angle of mobile computing device satisfied the threshold amount of change or the location at which mobile computing device 4 determined an activity transition, mobile computing device 4 may be configured to analyze motion data, in view of the current position determined by positioning system 12, to determine the position at which mobile computing device 4 made the corresponding determination. That is, mobile computing device 4 may determine a position of mobile computing device 4 at a prior time when positioning system 12 was unable to ascertain the current position of mobile computing device 4.

As one example, application processors 42 may determine, while in a first power mode and based on first motion data generated by motion sensor 24, a first activity of a user associated with mobile computing device 4, where the first motion data indicating movement of the mobile computing device during a first time period (e.g., 1 second, 3 seconds, 10 seconds, etc.). While application processors 42 determine a first activity of the user, mobile computing device 4 may be in a first orientation. For example, mobile computing device 4 may on a user's person (e.g., in a pocket of a user and/or in a user's hand which may be at the user's side), in which case mobile computing device 4 may be in a horizontal orientation, a vertical orientation, or some other orientation. As one example, application processors 42 analyze the first motion data and determine that the current activity is riding in a vehicle (e.g., car 2 of FIG. 1).

After determining the current activity of the user, mobile computing device 4 may be in a low-power state in which one or more components of mobile computing device 4 may be off, deactivated, sleeping, have limited functionality, etc. For instance, at the first time, a display of UID 14 may be deactivated, one or more of sensors 10 may be off, and SCM 8 and application processors 42 may be in a low power or "sleep" state. In this way, mobile computing device 4 may consume a reduced amount of power in the low-power state when compared to a normal operating state. That is, application processors 42 may transition from operating in the first power mode to operating in a second power mode, wherein the processor consumes less power while operating in the second power mode than while operating in the first power mode.

In any case, the user may move mobile computing device 4 from a first to a second orientation (e.g., by standing up with the device in the user's pocket, etc.). Prior to mobile computing device being tilted, mobile computing device 4 may be in a static operating state. In the static operating state, motion sensor 24 may provide motion data corresponding to the movement of mobile computing device 4 to tilt module 28. Based on the motion data received from sensor 24, tilt module 28 may determine that, at the first time, mobile computing device 4 has tilted. For instance, tilt module 28 may determine that mobile computing device 4 has tilted if the motion data received from motion sensor 24 indicates that the change in the angle of mobile computing device 4 relative to gravity satisfies a threshold amount of change. In some examples, tilt module 28 may determine that mobile computing device 4 has moved from a first orientation to a second orientation. That is, while application processors 14 are operating in the second power mode, tilt module 28 of motion module 6 may determine, based on second motion data generated by motion sensor 24, that a change in an angle of the mobile computing device relative to gravity satisfies a threshold amount of change.

In some examples, tilt module 28 may analyze one or more axes of motion data as a group. For instance, tilt module 28 may determine that a derivative of a combination of two or more axes acceleration data is greater than a threshold. In any case, responsive to determining that mobile computing device 4 has tilted, tilt module 28 may output a signal (e.g., an interrupt signal) to SCM 8. In some examples, responsive to determining that mobile computing device 4 has tilted, mobile computing device 4 may transition from the static operational state to an "activity detection and location determination" operational state. That is, responsive to determining that the change in the angle satisfies the threshold amount of change, applications processors 42 and positioning system 12 may each transition from operating in the second power mode to operating in the first power mode. In other words, responsive to determining that the change in the angle satisfies the threshold amount of change, mobile computing device 4 may activate positioning system 12. In some examples, mobile computing device 4 may transition from the static operational state to the activity detection and location determination operational state when mobile computing device 4 has tilted.

In the activity detection and location determination operation state, mobile computing device 4 may determine a current activity of a user of mobile computing device 4 and a current location of mobile computing device 4. For example application processors 42 may determine, based on second motion data generated by motion sensor 24 during a second time period, a second activity of the user of mobile computing device 4. To detect an activity transition, application processors 42 may determine whether the second activity (i.e., the user activity determined after the tilt event) is different from the first activity (e.g., the user activity determined prior to the tilt event).

To determine the current location of mobile computing device 4, positioning system 12 may initiate a location determination process, which may include receiving external signals (e.g., GPS signals from a GPS satellite). In some instances, mobile computing device 4 may also initiate storage of motion data generated by motion module 6. For example, mobile computing device 4 may initiate storage of the motion data responsive to determining that greater than a threshold amount of time has elapsed since positioning system 12 initiated the location determination process and a current time. The threshold amount of time may be any amount of time, such as one second, two seconds, ten seconds, etc. and may be configured by a user of mobile computing device 4 or automatically determined (e.g., dynamically adjusted) based on movement of mobile computing device 4. For example, if motion module 6 generates motion data that indicates mobile computing device 4 is moving quickly, mobile computing device 4 may initiate storage of the motion data sooner than if the motion data indicates that mobile computing device 4 is relatively stationary. As another example, mobile computing device 4 may initiate storage of the motion data responsive to determining that the change in the angle satisfies the threshold amount of change and without waiting a threshold amount of time.

Responsive to determining that the second activity is different from the first activity, mobile computing device 4 may perform an action. The action may include storing a current location of mobile computing device 4 (e.g., based on sensor data received from a global positioning system sensor), outputting information about the first or second activity, or any other action. Mobile computing device 4 may determine the particular action based on the first activity, the second activity, the determination that the second activity is different from the first activity, or any combination thereof. For example, if the first activity is riding in a vehicle (e.g., driving the vehicle, passenging in the vehicle, etc.) and the second activity is walking or otherwise traveling by foot, mobile computing device 4 may store a location of mobile computing device 4 at the time mobile computing device 4 determined that the change in the angle of mobile computing device 4 relative to gravity satisfied a threshold amount of change as an indication of a location at which the user exited the vehicle (e.g., where the vehicle is parked).

In order to determine the location of mobile computing device 4 at the time mobile computing device 4 determined that the change in the angle of mobile computing device 4 relative to gravity satisfied a threshold amount of change (referred to herein as the "reference time"), mobile computing device 4 initiates storage of motion data (e.g., within data repository 56) and positioning system 12 initiates a current location determination process. For example, SCM 8 causes positioning system 12 to transition from operating in a low-power state to operating in a higher-power state. While operating in the higher-power state, positioning system 12 begins attempting to detect external signals, such as GPS signals from one or more GPS satellites. In some instances, positioning system 12 is unable receive sufficient external signals to determine the current location of mobile computing device before a threshold amount of time has elapsed since the current location determination process was initiated. For example, positioning system 12 may be unable to lock onto three different GPS satellites for a period of time. During that period of time, the position of mobile computing device 4 may change. At a later time (e.g., 10 seconds later, 30 seconds later, one minute later, etc.), positioning system 12 may determine, based on external signals, the current location of mobile computing device 4.

In some examples, mobile computing device 4 stores motion data generated by motion sensor 24 of motion module 6 in response to mobile computing device 4 determining that the change in the angle of mobile computing device 4 relative to gravity satisfies a threshold amount of change. In these examples, parking module 16 may receive, from positioning system 12 or another element of mobile computing device 4, an indication positioning system 12 has determined the current location of mobile computing device 4. Responsive to receiving the indication, parking module 16 may retrieve, from data repository 56, motion data for the period of time between a time at which mobile computing device 4 determined that the change in the angle of mobile computing device 4 relative to gravity satisfied a threshold amount of change and a time at which positioning system 12 determined the current location of mobile computing device 4. Using this data, parking module 16 may determine the location of mobile computing device 4 at the time mobile computing device 4 determined that the change in the angle of mobile computing device 4 relative to gravity satisfied a threshold amount of change, which may be referred to herein as the "reference position" of mobile computing device 4. The reference position may correspond to location 20 of FIG. 1.

In general, parking module 12 re-creates, using the stored motion data, a path along with mobile computing device 4 traveled between the reference position and the current location of mobile computing device 4 (e.g., path 18 of FIG. 1) and, the origin of the path, when the current location of the mobile computing device 4 is used as the ending point of the path, corresponds to the location of the reference position. As one example, the stored motion data includes accelerometer data generated by motion module 6 and indicates movement of mobile computing device 4 detected by motion module 6. The accelerometer data includes acceleration information for detected accelerations in the X, Y, and Z directions. Parking module 12 determines the acceleration values at the reference time to determine an initial motion vector of mobile computing device 4. The initial motion vector includes a direction of motion and amplitude of motion (e.g., the direction and the speed at which mobile computing device 4 initially moved).

Parking module 12 may continue to analyze the accelerometer data to determine subsequent motion vectors that correspond to the movement of mobile computing device 4. Using the determined motion vectors, parking module 12 may determine a relative direction and speed of mobile computing device 4 at each moment in time. Parking module 12 maps the sequence of motion vectors to a path along which mobile computing device 4 traveled. The termination point of the path corresponds to the location at which positioning system 12 successfully determined the current location of mobile computing device 4.

In some examples, the motion data does not indicate a direction of travel. In these examples, one of sensors 10 (i.e., a gyroscope) may also be activated at the reference time. The gyroscope may store data indicative of the direction of movement of mobile computing device 4 which, in combination with the accelerometer data, may enable parking module 16 to determine the reference location based on the current location of mobile computing device 4. In some examples, positioning module 12 determines a heading of mobile computing device 4 in addition to the current location of mobile computing device 4. In these examples, parking module 16 may determine the reference position of mobile computing device 4 without the aid of motion data generated by a gyroscope. Using the current heading of mobile computing device 4, as determined by positioning system 12, parking module 16 may align the determined path with the current heading, thereby determining the reference location. Responsive to determining the reference position, mobile computing device 4 may store an indication of the reference position as a location at which a vehicle is parked and may cause positioning system 12 to transition from operating in the higher-power state to operating in the low-power state or to be deactivated.

In this way, techniques of this disclosure may enable mobile computing device 4 to automatically determine when a user has exited a car and determine the location of the car, even when mobile computing device 4 is unable to determine a current location of mobile computing device 4 for a period of time after the user parked and exited the car.

Mobile computing device 4 may be configured to store information for multiple different locations of parked cars determined using the techniques described above. For example, a user may park a vehicle at an airport, get on a plane, travel to a different location, rent a car and subsequently park and re-park the rented car several times before flying back to the airport and retrieving the previously parked vehicle. The various different parked car locations may be stored locally at mobile computing device 4, may be stored remotely at a server system (e.g., a cloud-based storage system), or any combination thereof.

Rather than presenting a user of mobile computing device 4 with multiple locations of parked vehicles, parking module 16 may select one or more locations of parked vehicles (e.g., a position history of mobile computing device 4) and present those selected locations to the user (e.g., in a graphical user interface output by UID 14). That is, parking module 16 may retrieve, from data repository 56, a position history of mobile computing device 4. The position history may include a plurality of previously determined reference positions of mobile computing device 4.

To select the locations to present to the user, parking module 16 may rank one or more of the stored parking locations based on, for example, proximity to a current location of mobile computing device 4 and proximity in time. For example, stored locations that are geographically closer to the current location of mobile computing device 4 may be given a higher ranking than locations farther away from the current location of mobile computing device 4. That is, parking module 16 may determine a subset of the plurality of previously determined reference positions located within a threshold distance from the current position of mobile computing device 4. In some examples, parking module 16 may be configured to exclude locations greater than a threshold distance away (e.g., greater than two miles, five miles, etc.).

As another example, locations that were determined and stored more recently than some location may be given a higher ranking than locations that were determined and stored less recently than other locations. Parking module 16 may determine the subset of the plurality of previously determined reference positions by at least excluding, based on a difference between a current time and the respective time at which each corresponding previously determined reference position of the plurality of previously determined reference positions was determined, one or more previously determined reference positions from the plurality of previously determined reference positions As yet another example, parking module 16 may select, from the position history, one or more locations visited by a user of mobile computing device 4 at least a threshold number of times and may exclude, based on the one or more locations visited by the user at least a threshold number of times, one or more previously determined reference positions from the plurality of previously determined reference positions.

In some example, mobile computing device 4 may be configured to provide a mechanism by which a user of mobile computing device 4 may browse and/or edit all stored locations. In this way, parking module 16 may be configured to present the locations of parked vehicles determined to be most relevant to a user of mobile computing device 4, while still providing the flexibility for the user to view all stored locations.

Figure 3:
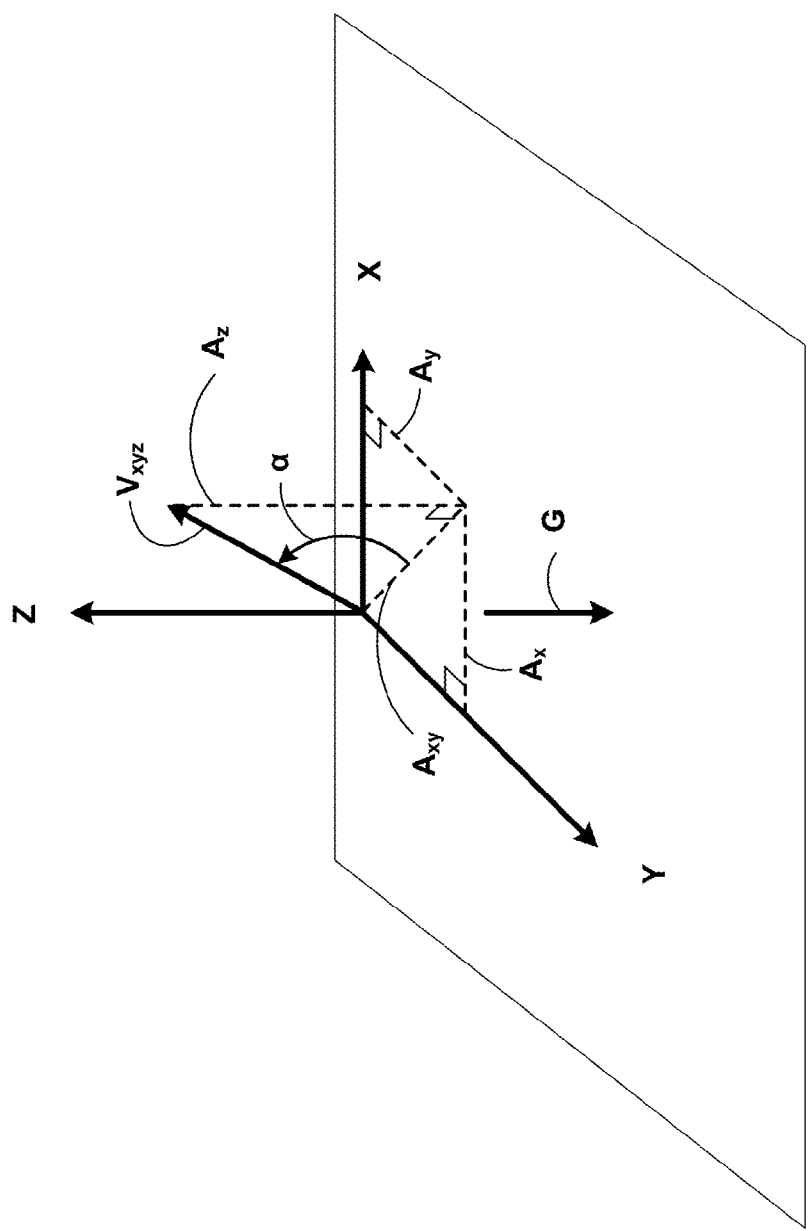
FIG. 3 illustrates an example orientation vector of a mobile device detected by a motion sensor, in accordance with one or more techniques of the present disclosure.

FIG. 3 illustrates an example orientation vector of a mobile device detected by a motion sensor, in accordance with one or more techniques of the present disclosure. As illustrated by FIG. 3, $V_{XYZ}$ may correspond to a vector, which represents the orientation of a device, such as of mobile computing device 4 as illustrated in FIG. 1, in three dimensions.

The orientation of mobile computing device 4, and, in particular, the vector, $V_{xyz}$ may be defined by the magnitudes of the vector in the X, Y, and Z directions $A_x$, $A_y$, and $A_z$, respectively, as well as the angles between the vector and each of the X, Y, and Z axes (not shown in FIG. 3). In some examples, one or more processors of mobile computing device 4 may operate according to one or more techniques that approximate the orientation of mobile computing device 4 as one of horizontal or vertical based on the angle, α, between the orientation vector, $V_{xyz}$, and the projection of the vector onto the horizontal X-Y plane.

For example, one or more of processors 26 and/or processors 30 may receive the magnitudes $A_x$, $A_y$, $A_z$ of vector, $V_{xyz}$ in the X, Y, Z directions from a motion sensor, such as motion sensor 24, respectively in the example of FIG. 3. One or more of processors 26 and/or processors 30 may then calculate the magnitude, $A_{xy}$, of the projection of vector, $V_{xyz}$ in the X-Y plane according to the following formula.

$$A_{xy} = \sqrt{A_x^2 + A_y^2} \tag{1}$$

One or more of processors 26 and/or processors 30 may then calculate the angle, α, between the orientation vector, $V_{xyz}$, and the projection of the vector onto the horizontal X-Y plane as a function of the arc tangent of the magnitude, $A_z$, of the vertical component of the orientation vector, $V_{xyz}$ and the magnitude, $A_{xy}$, of the projection of the vector in the X-Y plane. For example, one or more of processors 26 and/or processors 30 may calculate the angle, α, according to the following formula.

$$\alpha = \arctan\left(\frac{A_z}{A_{xy}}\right) \tag{2}$$

In one example, one or more of processors 26 and/or processors 30 may approximate the orientation of mobile computing device 4 as vertical when the angle, α, between the orientation vector, $V_{xyz}$, and the projection of the vector onto the horizontal X-Y plane is greater than a threshold. In some examples, the threshold may be 35 degrees. In some examples, the threshold may be 50 degrees.

In accordance with or more techniques of this disclosure, one or more of processors 26 may determine, based on motion data measured by motion sensor 24, that mobile computing device 4 has moved from a first orientation to a second, different orientation. For instance, one or more of processors 26 may determine the magnitude, $A_{xy}$, of the projection of vector, $V_{xyz}$ in accordance with formula (1), above, at a first time (resulting in $A_{xy1}$) and at a second time ($A_{xy2}$). In some examples, if the difference between $A_{xy1}$ and $A_{xy2}$ is greater than a threshold, one or more of processors 26 may determine that mobile computing device 4 has tilted.

Figure 4:
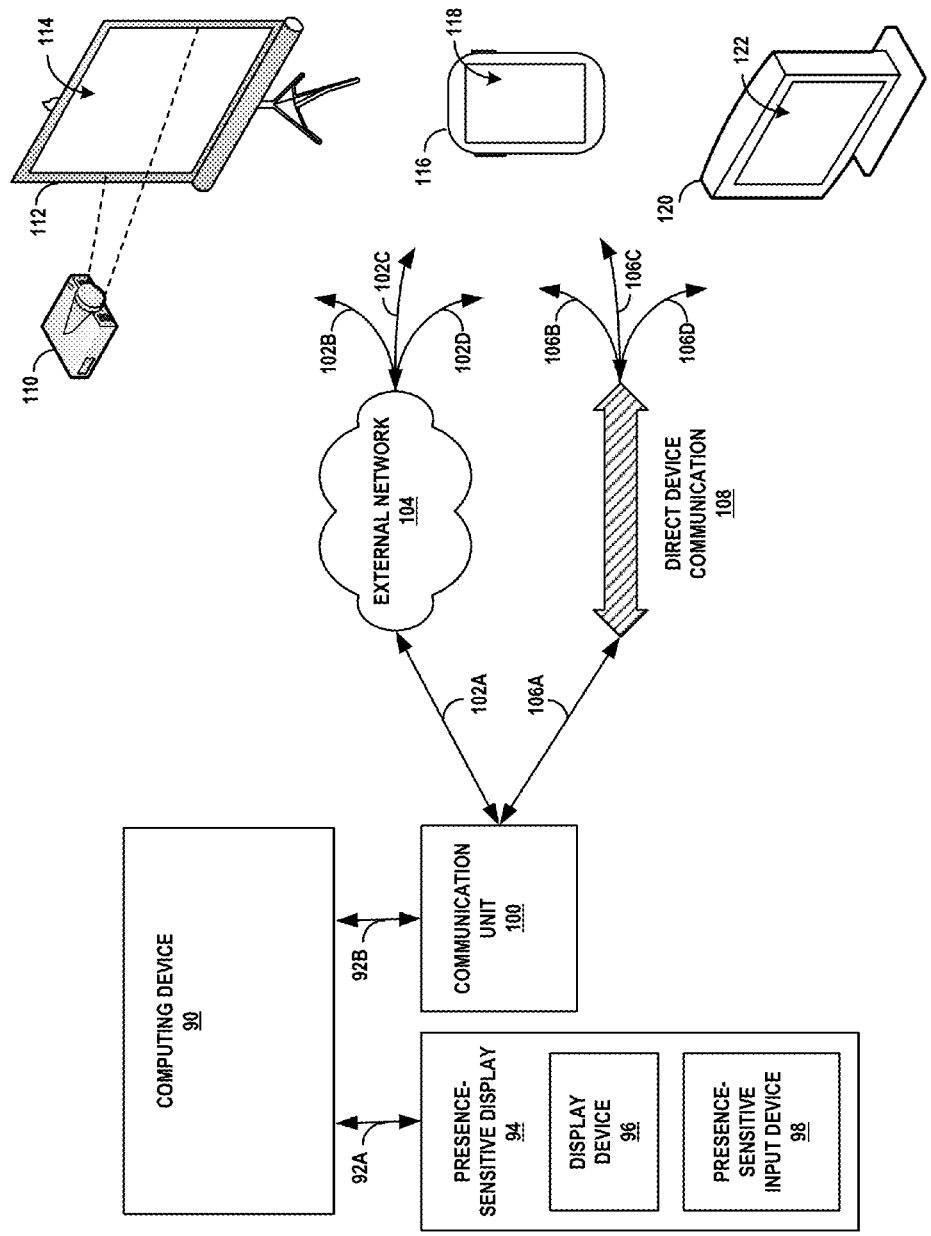
FIG. 4 is a block diagram illustrating an example computing device that outputs graphical content for display at a remote device, in accordance with one or more techniques of the present disclosure.

FIG. 4 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 4 includes a computing device 90, presence-sensitive display 94, communication unit 100, projector 110, projector screen 112, mobile device 116, and visual display device 120. Although shown for purposes of example in FIGS. 1 and 2 as stand-alone mobile computing device 4, a computing device, such as computing device 90 may, generally, be any component or system that includes a processor or other suitable computing environment for executing software instructions and, for example, need not include a presence-sensitive display.

As shown in the example of FIG. 4, computing device 90 may be a processor that includes functionality as described with respect to processor 40 in FIG. 2. In such examples, computing device 90 may be operatively coupled to presence-sensitive display 94 by a communication channel 92A, which may be a system bus or other suitable connection. Computing device 90 may also be operatively coupled to communication unit 100, further described below, by a communication channel 92B, which may also be a system bus or other suitable connection. Although shown separately as an example in FIG. 4, computing device 90 may be operatively coupled to presence-sensitive display 94 and communication unit 100 by any number of one or more communication channels.

In other examples, such as illustrated previously by mobile computing device 4 in FIGS. 1-2, a computing device may refer to a portable or mobile device such as mobile phones (including smart phones), wearable computing devices (including smart watches) laptop computers, etc.

Presence-sensitive display 94, like UID 14 of FIG. 1, may include display device 96 and presence-sensitive input device 98. Display device 96 may, for example, receive data from computing device 90 and display the graphical content. In some examples, presence-sensitive input device 98 may determine one or more user inputs (e.g., continuous gestures, multi-touch gestures, single-touch gestures, etc.) at presence-sensitive display 94 using capacitive, inductive, and/or optical recognition techniques and send indications of such user input to computing device 90 using communication channel 92A. In some examples, presence-sensitive input device 98 may be physically positioned on top of display device 96 such that, when a user positions an input unit over a graphical element displayed by display device 96, the location at which presence-sensitive input device 98 corresponds to the location of display device 96 at which the graphical element is displayed. In other examples, presence-sensitive input device 98 may be positioned physically apart from display device 96, and locations of presence-sensitive input device 98 may correspond to locations of display device 96, such that input can be made at presence-sensitive input device 98 for interacting with graphical elements displayed at corresponding locations of display device 96.

As shown in FIG. 4, computing device 90 may also include and/or be operatively coupled with communication unit 100. Examples of communication unit 100 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 90 may also include and/or be operatively coupled with one or more other devices, e.g., input devices, output devices, memory, storage devices, etc. that are not shown in FIG. 4 for purposes of brevity and illustration.

FIG. 4 also illustrates a projector 110 and projector screen 112. Other such examples of projection devices may include electronic whiteboards, holographic display devices, and any other suitable devices for displaying graphical content. Projector 110 and projector screen 112 may include one or more communication units that enable the respective devices to communicate with computing device 90. In some examples, the one or more communication units may enable communication between projector 110 and projector screen 112. Projector 110 may receive data from computing device 90 that includes graphical content. Projector 110, in response to receiving the data, may project the graphical content onto projector screen 112. In some examples, projector 110 may determine one or more user inputs (e.g., continuous gestures, multi-touch gestures, single-touch gestures, etc.) at projector screen using optical recognition or other suitable techniques and send indications of such user input using one or more communication units to computing device 90. In such examples, projector screen 112 may be unnecessary, and projector 110 may project graphical content on any suitable medium and detect one or more user inputs using optical recognition or other such suitable techniques.

Projector screen 112, in some examples, may include a presence-sensitive display 114. Presence-sensitive display 114 may include a subset of functionality or all of the functionality of UID 10 as described in this disclosure. In some examples, presence-sensitive display 94 may include additional functionality. Projector screen 112 (e.g., an electronic whiteboard) may receive data from computing device 90 and display the graphical content. In some examples, presence-sensitive display 114 may determine one or more user inputs (e.g., continuous gestures, multi-touch gestures, single-touch gestures, etc.) at projector screen 112 using capacitive, inductive, and/or optical recognition techniques and send indications of such user input using one or more communication units to computing device 80.

FIG. 4 also illustrates mobile device 116 and visual display device 120. Mobile device 116 and visual display device 120 may each include computing and connectivity capabilities. Examples of mobile device 116 may include e-reader devices, convertible notebook devices, hybrid slate devices, wearable computing devices, etc. Examples of visual display device 120 may include other semi-stationary devices such as televisions, computer monitors, etc. As shown in FIG. 4, mobile device 116 may include a presence-sensitive display 118. Visual display device 120 may include a presence-sensitive display 122. Presence-sensitive displays 118, 122 may include a subset of functionality or all of the functionality of UID 10 as described in this disclosure. In some examples, presence-sensitive displays 118, 122 may include additional functionality. In any case, presence-sensitive display 122, for example, may receive data from computing device 90 and display the graphical content. In some examples, presence-sensitive display 122 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 90.

As described above, in some examples, computing device 90 may output graphical content for display at presence-sensitive display 94 that is coupled to computing device 90 by a system bus or other suitable communication channel. Computing device 90 may also output graphical content for display at one or more remote devices, such as projector 110, projector screen 112, mobile device 116, and visual display device 120. For instance, computing device 90 may execute one or more instructions to generate and/or modify graphical content in accordance with techniques of the present disclosure. Computing device 90 may output the data that includes the graphical content to a communication unit of computing device 90, such as communication unit 100. Communication unit 100 may send the data to one or more of the remote devices, such as projector 110, projector screen 112, mobile device 116, and/or visual display device 120. In this way, computing device 90 may output the graphical content for display at one or more of the remote devices. In some examples, one or more of the remote devices may output the graphical content at a presence-sensitive display that is included in and/or operatively coupled to the respective remote devices.

In some examples, computing device 90 may not output graphical content at presence-sensitive display 94 that is operatively coupled to computing device 90. In other examples, computing device 90 may output graphical content for display at both a presence-sensitive display 94 that is coupled to computing device 90 by communication channel 92A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 90 and output for display at presence-sensitive display 94 may be different than graphical content display output for display at one or more remote devices.

Computing device 90 may send and receive data using any suitable communication techniques. For example, computing device 90 may be operatively coupled to external network 104 using network link 102A. Each of the remote devices illustrated in FIG. 4 may be operatively coupled to network external network 104 by one of respective network links 102B, 102C, and 102D. External network 104 may include network hubs, network switches, network routers, etc., that are operatively inter-coupled thereby providing for the exchange of information between computing device 90 and the remote devices illustrated in FIG. 4. In some examples, network links 102A-102D may be Ethernet, ATM or other network connections. Such connections may be wireless and/or wired connections.

In some examples, computing device 90 may be operatively coupled to one or more of the remote devices included in FIG. 4 using direct device communication 108. Direct device communication 108 may include communications through which computing device 90 sends and receives data directly with a remote device, using wired or wireless communication. That is, in some examples of direct device communication 108, data sent by computing device 90 may not be forwarded by one or more additional devices before being received at the remote device, and vice-versa. Examples of direct device communication 108 may include Bluetooth, Near-Field Communication, Universal Serial Bus, Wi-Fi, infrared, etc. One or more of the remote devices illustrated in FIG. 4 may be operatively coupled with computing device 90 by communication links 106A-106D. In some examples, communication links 106A-106D may be connections using Bluetooth, Near-Field Communication, Universal Serial Bus, infrared, etc. Such connections may be wireless and/or wired connections.

In accordance with techniques of the disclosure, computing device 90 may be operatively coupled to visual display device 120 using external network 104. A first motion module of computing device 90 may determine, based on motion data measured by a motion sensor, that computing device 90 has tilted. Responsive to determining that computing device 90 has tilted, computing device 90 may determine a current activity of a user of computing device 90 and may output, for display, information associated with a prior activity of the user and/or the current activity of the user. Further, computing device 90 may determine, based on motion data generated between the reference time and a time at which computing device 90 determined the current location of computing device 90, the reference location of computing device 90 and output the reference location as the location at which a vehicle is parked. For example, computing device 90 may output information associated with a user activity at display device 96 of presence-sensitive display 94, projector 110, presence-sensitive display 118 of mobile device 116, and/or presence-sensitive display 122 of visual display device 120.

Figure 5:
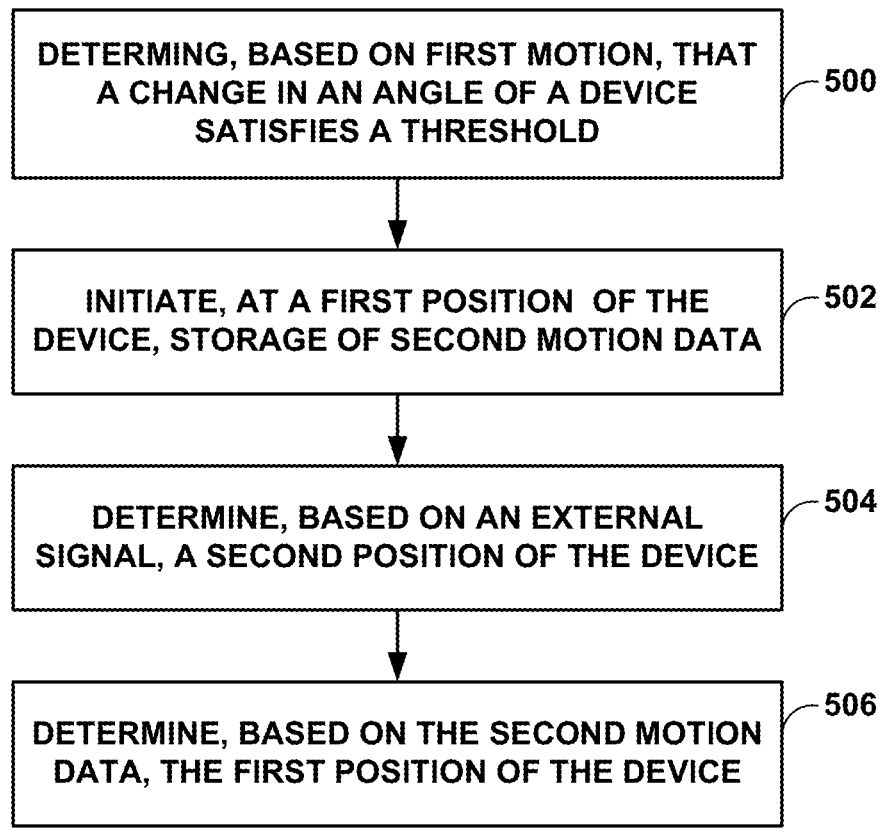
FIG. 5 is a flow diagram illustrating example operations of a computing device that automatically determines a previous location based on motion data, in accordance with one or more techniques of the present disclosure.

FIG. 5 is a flow diagram illustrating example operations of a computing device that automatically determines a previous location based on motion data, in accordance with one or more techniques of the present disclosure. The techniques of FIG. 5 may be performed by one or more processors of a computing device, such as mobile computing device 4 illustrated in FIG. 1 and FIG. 2. For purposes of illustration, the techniques of FIG. 5 are described within the context of mobile computing device 4 of FIG. 1 and FIG. 2, although computing devices having configurations different than that of mobile computing device 4 may perform the techniques of FIG. 5.

In accordance with one or more techniques of the disclosure, motion module 6 of mobile computing device 4 may analyze first motion data generated by motion sensor 24 to determine that a change in an angle of the mobile computing device relative to gravity satisfies a threshold amount of change (500). For example, the first motion data may indicate the change in the angle of mobile computing device 4 relative to gravity exceeds 35 degrees. When the change in the angle of mobile computing device 4 satisfies the threshold, motion module 6 may determine that mobile computing device has tilted.

Responsive to determining that the change in the angle satisfies the threshold amount of change, responsive to determining that the change in the angle satisfies the threshold amount of change, mobile computing device 4 may initiate, at a first position of mobile computing device 4, storage of second motion data generated by motion sensor 24, where the first position is a reference position (502). The second motion data may correspond to a series of movements of mobile computing device 4 during a time period occurring from a time at which motion module 6 determined that the change in the angle satisfies the threshold amount of change to a time at which positioning system 12 determined the current position of mobile computing device 4.

Positioning system 12 of mobile computing device 4 may determine, based on an external signal, a second position of mobile computing device 4, where the second position is a current position of the mobile computing device that is different from the reference position (504). In some examples, responsive to determining that the change in the angle satisfies the threshold amount of change, mobile computing device 4 may activate positioning system 12. Responsive to determining the second position of mobile computing device 4, parking module 16 of mobile computing device 4 may determine, based on the second motion data and the second location, the reference position of the mobile computing device at which the mobile computing device initiated storage of the second motion data (506). In some examples, mobile computing device 4 may store an indication of the determined reference location and may, responsive to storing the indication of the reference position, deactivate positioning system 12.

In addition to determining the current position of mobile computing device 4, in some examples, positioning system 12 may also determine a current heading of mobile computing device 4. In such examples, parking module 16 may generate, based on the second motion data, a path of mobile computing device 4 by at least analyzing the second motion data relative to the current position of mobile computing device 4 and the current heading of mobile computing device 4.

In some examples, prior to determining that a change in an angle of mobile computing device 4 relative to gravity satisfies a threshold amount of change, application processors 42 may determine, based on third motion data generated by motion sensor 24 that a user associated with the mobile computing device is riding in a vehicle. Responsive to determining that the change in the angle of the mobile computing device relative to gravity satisfies the threshold amount of change, application processors 42 may determine, based on the second motion data, that the user of the mobile computing device is traveling by foot. In such examples, the reference position may correspond to a location at which the user exited a vehicle (e.g., where the vehicle is parked).

EXAMPLE 1

A method comprising: determining, by a mobile computing device and based on first motion data generated by a motion sensor of the mobile computing device, that a change in an angle of the mobile computing device relative to gravity satisfies a threshold amount of change; responsive to determining that the change in the angle satisfies the threshold amount of change, initiating, at a first position of the mobile computing device, storage of second motion data generated by the motion sensor, wherein the first position is a reference position; determining, by the mobile computing device and based on an external signal, a second position of the mobile computing device, wherein the second position is a current position of the mobile computing device that is different from the reference position; and, responsive to determining the second position of the mobile computing device, determining, by the mobile computing device, based on the second motion data and the second location, the reference position of the mobile computing device at which the mobile computing device initiated storage of the second motion data.

EXAMPLE 2

The method of example 1, further comprising: determining, by the mobile computing device, a current heading of the mobile computing device, wherein determining the position of the mobile computing device at which the mobile computing device initiated storage of the second motion data comprises: determining, by the mobile computing device and based on the second motion data, a path of the mobile computing device by at least analyzing the second motion data relative to the current position of the mobile computing device and the current heading of the mobile computing device; and determining, by the mobile computing device, that an initial location associated with the path of the mobile computing device is the reference position.

EXAMPLE 3

The method of any combination of examples 1-2, further comprising: prior to determining that a change in an angle of the mobile computing device relative to gravity satisfies a threshold amount of change, determining, by the mobile computing device and based on third motion data generated by the motion sensor of the mobile computing device, that a user associated with the mobile computing device is riding in a vehicle; responsive to determining that the change in the angle of the mobile computing device relative to gravity satisfies the threshold amount of change, determining, by the mobile computing device and based on the second motion data, that the user of the mobile computing device is traveling on foot, wherein the reference position corresponds to a location at which the user exited the vehicle; and storing, by the mobile computing device, an indication of the reference position as the location at which the user exited the vehicle.

EXAMPLE 4

The method of any combination of examples 1-3, further comprising: responsive to determining that the change in the angle satisfies the threshold amount of change, activating a positioning system of the mobile computing device, wherein the current position of the mobile computing device is determined by the positioning system.

EXAMPLE 5

The method of any combination of examples 1-4, further comprising: responsive to storing, by the mobile computing device, an indication of the reference position, deactivating, by the mobile computing device, the positioning system.

EXAMPLE 6

The method of any combination of examples 1-5, wherein the second motion data corresponds to a series of movements of the mobile computing device during a time period occurring from a time at which the mobile computing device determined that the change in the angle satisfies the threshold amount of change to a time at which the mobile computing device determined the current position of the mobile computing device.

EXAMPLE 7

The method of any combination of examples 1-6, further comprising: retrieving, by the mobile computing device, a position history of the mobile computing device, the position history including a plurality of previously determined reference positions of the mobile computing device, wherein the reference position of the mobile computing device is one reference position of the plurality of previously determined reference positions; determining, by the mobile computing device, a subset of the plurality of previously determined reference positions located within a threshold distance from the current position of the mobile computing device; and outputting, by the mobile computing device and for display, a graphical indication of one or more of the subset of the plurality of previously determined reference positions.

EXAMPLE 8

The method of example 7, further comprising: determining, by the mobile computing device, an updated current position of the mobile computing device; receiving, by the mobile computing device, an indication of user input to select a previously determined reference position of the one or more of the subset of the plurality of previously determined reference positions; and outputting, by the mobile computing device and for display, an indication of navigational directions to travel from the updated current position of the mobile computing device to the selected previously determined reference position.

EXAMPLE 9

The method of example 7, wherein determining the subset of the plurality of previously determined reference positions comprises: determining, by the mobile computing device, one or more locations visited by a user of the mobile computing device at least a threshold number of times; and excluding, based on the one or more locations visited by the user at least a threshold number of times, one or more previously determined reference positions from the plurality of previously determined reference positions.

EXAMPLE 10

The method of example 7, wherein each previously determined reference position of the plurality of previously determined reference positions was determined at a respective time, and wherein determining the subset of the plurality of previously determined reference positions comprises excluding, by the mobile computing device, based on a difference between a current time and the respective time at which each corresponding previously determined reference position of the plurality of previously determined reference positions was determined, one or more previously determined reference positions from the plurality of previously determined reference positions.

EXAMPLE 11

The method of any combination of examples 1-10, wherein the motion sensor is an accelerometer.

EXAMPLE 12

A mobile computing device comprising: one or more processors; a motion sensor; a motion module; a parking module; and a positioning system. The motion module determines, based on the first motion data generated by the motion sensor, that a change in an angle of the mobile computing device relative to gravity satisfies a threshold amount of change, and, responsive to determining that the change in the angle satisfies the threshold amount of change, initiates, at a first position of the mobile computing device, storage of second motion data generated by the motion sensor, wherein the first position is a reference position. The positioning system determines, based on an external signal, a second position of the mobile computing device, wherein the second position is a current position of the mobile computing device that is different from the reference position. The parking module is operable by the one or more processors to, responsive to determining the second position of the mobile computing device, determine, based on the second motion data and the current position, the reference position of the mobile computing device.

EXAMPLE 13

The mobile computing device of example 12, wherein the positioning system determines a current heading of the mobile computing device, and wherein the parking module is operable by the one or more processors to determine, based on the second motion data, a path of the mobile computing device by at least analyzing the second motion data relative to the current position of the mobile computing device and the current heading of the mobile computing device, and determine that an initial location associated with the path of the mobile computing device is the reference position

EXAMPLE 14

The mobile computing device of any combination of examples 12-13, wherein the one or more processors, prior to the motion module determining that a change in an angle of the mobile computing device relative to gravity satisfies a threshold amount of change, determine, based on third motion data generated by the motion, that a user associated with the mobile computing device is riding in a vehicle, responsive to the motion module determining that the change in the angle of the mobile computing device relative to gravity satisfies the threshold amount of change, determine, based on the second motion data, that the user of the mobile computing device is traveling on foot, wherein the reference position corresponds to a location at which the user exited the vehicle, and stores an indication of the reference position as the location at which the user exited the vehicle.

EXAMPLE 15

The mobile computing device of any combination of examples 12-14, wherein the one or more processors, responsive to the motion module determining that the change in the angle satisfies the threshold amount of change, activate the positioning system.

EXAMPLE 16

The computing device of any combination of examples 12-15, wherein the one or more processors, responsive to storing an indication of the reference position, deactivate the positioning system.

EXAMPLE 17

The mobile computing device of any combination of examples 12-16, wherein the second motion data corresponds to a series of movements of the mobile computing device during a time period occurring from a time at which the mobile computing device determined that the change in the angle satisfies the threshold amount of change to a time at which the mobile computing device determined the current position of the mobile computing device.

EXAMPLE 18

The mobile computing device of any combination of examples 12-17, further comprising: a data repository that stores a position history of the mobile computing device, wherein the one or more processors retrieve the position history, the position history including a plurality of previously determined reference positions of the mobile computing device, wherein the reference position of the mobile computing device is one reference position of the plurality of previously determined reference positions, determine a subset of the plurality of previously determined reference positions located within a threshold distance from the current position of the mobile computing device, and output, for display, a graphical indication of one or more of the subset of the plurality of previously determined reference positions.

EXAMPLE 19

The mobile computing device of example 18, wherein the positioning system determines an updated current position of the mobile computing device, and wherein the one or more processors receive an indication of user input to select a previously determined reference position of the one or more of the subset of the plurality of previously determined reference positions, and output, for display, an indication of navigational directions to travel from the updated current position of the mobile computing device to the selected previously determined reference position.

EXAMPLE 20

The mobile computing device of example 18, wherein the one or more processors determine one or more locations visited by a user of the mobile computing device at least a threshold number of times, and exclude, based on the one or more locations visited by the user at least a threshold number of times, one or more previously determined reference positions from the plurality of previously determined reference positions.

EXAMPLE 21

The mobile computing device of example 18, wherein each previously determined reference position of the plurality of previously determined reference positions was determined at a respective time, and wherein the one or more processors determine the subset of the plurality of previously determined reference positions by at least excluding, based on a difference between a current time and the respective time at which each corresponding previously determined reference position of the plurality of previously determined reference positions was determined, one or more previously determined reference positions from the plurality of previously determined reference positions.

EXAMPLE 22

The mobile computing device of any combination of examples 12-21, wherein the motion sensor is an accelerometer.

EXAMPLE 23

A non-transitory computer-readable storage encoded with instructions that, when executed, cause at least one of a plurality of processors of a mobile computing device to: determine, based on first motion data generated by a motion sensor of the mobile computing device, that a change in an angle of the mobile computing device relative to gravity satisfies a threshold amount of change; responsive to determining that the change in the angle satisfies the threshold amount of change, initiate, at a first position of the mobile computing device, storage of second motion data generated by the motion sensor, wherein the first position is a reference position; determine, based on an external signal, a second position of the mobile computing device, wherein the second position is a current position of the mobile computing device that is different from the reference position; and, responsive to determining the second position of the mobile computing device, determine, based on the second motion data and the current position, the reference position of the mobile computing device.

EXAMPLE 24

A non-transitory computer-readable storage medium encoded with instructions that, when executed, cause at least one of a plurality of processors of a mobile computing device to perform any combination of the techniques of examples 1-10.

EXAMPLE 25

A device comprising means for performing any combination of the techniques of examples 1-10.

EXAMPLE 26

A system comprising means for performing any combination of the techniques of examples 1-10.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
   determining, by a mobile computing device and based on first motion data generated by a motion sensor of the mobile computing device, that a user associated with the mobile computing device is riding in the vehicle;
   determining, by a mobile computing device based on second motion data generated by the motion sensor of the mobile computing device, that a change in an angle of the mobile computing device relative to gravity satisfies a threshold amount of change;
   responsive to determining that the change in the angle satisfies the threshold amount of change:
      initiating, at a first position of the mobile computing device, storage of third motion data generated by the motion sensor, wherein the first position is a reference position; and
      determining, by the mobile computing device and based on the third motion data, that the user of the mobile computing device is traveling on foot, wherein the reference position corresponds to a location at which the user exited the vehicle;
   receiving, by the mobile computing device, an external signal;
   determining, by the mobile computing device and based on the external signal, a second position of the mobile computing device, wherein the second position is a current position of the mobile computing device that is different from the reference position;
   responsive to determining the second position of the mobile computing device:

determining, by the mobile computing device, based on the third motion data and the current position, the reference position of the mobile computing device; and storing, by the mobile computing device, an indication of the reference position as the location at which the user exited the vehicle;

retrieving, by the mobile computing device, a position history of the mobile computing device, the position history including a plurality of previously determined reference positions of the mobile computing device, wherein the reference position of the mobile computing device is included in the plurality of previously determined reference positions;

determining, by the mobile computing device, a subset of the plurality of previously determined reference positions, wherein each determined reference position from the subset is located within a threshold distance from an updated current position of the mobile computing device; and outputting, by the mobile computing device and for display, a graphical indication of one or more of the subset of the plurality of previously determined reference positions.

2. The method of claim 1, further comprising:
determining, by the mobile computing device, a current heading of the mobile computing device,
wherein determining the position of the mobile computing device at which the mobile computing device initiated storage of the third motion data comprises:
determining, by the mobile computing device and based on the third motion data, a path of the mobile computing device by at least analyzing the third motion data relative to the current position of the mobile computing device and the current heading of the mobile computing device; and
determining, by the mobile computing device, that an initial location associated with the path of the mobile computing device is the reference position.

3. The method of claim 1, further comprising:
responsive to determining that the change in the angle satisfies the threshold amount of change, activating a positioning system of the mobile computing device, wherein the external signal is a positioning system signal, and wherein the current position of the mobile computing device is determined by the positioning system using the positioning system signal.

4. The method of claim 3, further comprising:
responsive to storing, by the mobile computing device, an indication of the reference position, deactivating, by the mobile computing device, the positioning system.

5. The method of claim 1, wherein the third motion data corresponds to a series of movements of the mobile computing device during a time period occurring from a time at which the mobile computing device determined that the change in the angle satisfies the threshold amount of change to a time at which the mobile computing device determined the current position of the mobile computing device.

6. The method of claim 1, further comprising:
receiving, by the mobile computing device, an indication of user input to select a previously determined reference position of the one or more of the subset of the plurality of previously determined reference positions; and
outputting, by the mobile computing device and for display, an indication of navigational directions to travel from the updated current position of the mobile computing device of the selected previously determined reference position.

7. The method of claim 1, wherein determining the subset of the plurality of previously determined reference positions comprises:
determining, by the mobile computing device, one or more locations visited by a user of the mobile computing device at least a threshold number of times; and
excluding, based on the one or more locations visited by the user at least a threshold number of times, one or more previously determined reference positions from the plurality of previously determined reference positions.

8. The method of claim 1, wherein:
each previously determined reference position of the plurality of previously determined reference positions was determined at a respective time, and
determining the subset of the plurality of previously determined reference positions comprises excluding, by the mobile computing device, based on a difference between a current time and the respective time at which each corresponding previously determined reference position of the plurality of previously determined reference positions was determined, one or more previously determined reference positions from the plurality of previously determined reference positions.

9. The method of claim 1, wherein the motion sensor is an accelerometer.

10. A mobile computing device comprising:
one or more processors;
a motion sensor;
a motion module;
a parking module;
a data repository configured to store a position history of the mobile computing device; and
a positioning system,
wherein the motion module is configured to determine, based on first motion data generated by the motion sensor of the mobile computing device, that a user associated with the mobile computing device is riding in a vehicle, determine, based on second motion data generated by the motion sensor, that a change in an angle of the mobile computing device relative to gravity satisfies a threshold amount of change, and, responsive to determining that the change in the angle satisfies the threshold amount of change: initiate, at a first position of the mobile computing device, storage of third motion data generated by the motion sensor, wherein the first position is a reference position, and determine, based on the third motion data, that the user of the mobile computing device is traveling on foot, wherein the reference position corresponds to a location at which the user exited the vehicle,
wherein the positioning system is configured to receive an external signal, determine, based on the external signal, a second position of the mobile computing device, wherein the second position is a current position of the mobile computing device that is different from the reference position,
wherein the parking module is operable by the one or more processors to, responsive to determining the second position of the mobile computing device: determine, based on the third motion data and the current position, the reference position of the mobile computing device, and store an indication of the reference position as the location at which the user exited the vehicle, and wherein the parking module is operable by the one or more processors to retrieve the position history from the data repository, the position history including a plurality of previously determined reference positions of the mobile computing device, wherein the reference position of the mobile computing device is included in the plurality of previously determined reference positions, determine a subset of the plurality of previously determined reference positions, wherein each determined reference position from the subset is located within a threshold distance from an updated current position of the mobile computing device, and output, for display, a graphical indication of one or more of the subset of the plurality of previously determined reference positions.

11. The mobile computing device of claim 10, wherein:
the positioning system is configured to determine a current heading of the mobile computing device, and
the parking module is operable by the one or more processors to determine, based on the third motion data, a path of the mobile computing device by at least analyzing the third motion data relative to the current position of the mobile computing device and the current heading of the mobile computing device, and determine that an initial location associated with the path of the mobile computing device is the reference position.

12. The mobile computing device of claim 10, wherein the one or more processors, responsive to the motion module determining that the change in the angle satisfies the threshold amount of change, activate the positioning system.

13. The mobile computing device of claim 12, wherein the one or more processors, responsive to storing an indication of the reference position, deactivate the positioning system.

14. The mobile computing device of claim 10, wherein the third motion data corresponds to a series of movements of the mobile computing device during a time period occurring from a time at which the mobile computing device determined that the change in the angle satisfies the threshold amount of change to a time at which the mobile computing device determined the current position of the mobile computing device.

15. The mobile computing device of claim 10, wherein the one or more processors receive an indication of user input to select a previously determined reference position of the one or more of the subset of the plurality of previously determined reference positions, and output, for display, an indication of navigational directions to travel from the updated current position of the mobile computing device to the selected previously determined reference position.

16. The mobile computing device of claim 10, wherein the one or more processors determine one or more locations visited by a user of the mobile computing device at least a threshold number of times, and exclude, based on the one or more locations visited by the user at least a threshold number of times, one or more previously determined reference positions from the plurality of previously determined reference positions.

17. The mobile computing device of claim 10, wherein:
each previously determined reference position of the plurality of previously determined reference positions was determined at a respective time, and
the one or more processors determine the subset of the plurality of previously determined reference positions by at least excluding, based on a difference between a current time and the respective time at which each corresponding previously determined reference position of the plurality of previously determined reference positions was determined, one or more previously determined reference positions from the plurality of previously determined reference positions.

18. A non-transitory computer-readable storage medium encoded with instructions that, when executed, cause at least one of a plurality of processors of a mobile computing device to:
determine, based on first motion data generated by a motion sensor of the mobile computing device, that a user associated with the mobile computing device is riding in a vehicle;
determine, based on second motion data generated by the motion sensor of the mobile computing device, that a change in an angle of the mobile computing device relative to gravity satisfies a threshold amount of change;
responsive to determining that the change in the angle satisfies the threshold amount of change:
initiate, at a first position of the mobile computing device, storage of third motion data generated by the motion sensor, wherein the first position is a reference position; and
determine, based on the third motion data, that the user of the mobile computing device is traveling on foot, wherein the reference position corresponds to a location at which the user exited the vehicle;
determine, based on an external signal received by the mobile computing device, a second position of the mobile computing device, wherein the second position is a current position of the mobile computing device that is different from the reference position;
responsive to determining the second position of the mobile computing device:
determine, based on the third motion data and the current position, the reference position of the mobile computing device; and
store and indication of the reference position as the location at which the user exited the vehicle;
retrieve a position history of the mobile computing device, the position history including a plurality of previously determined reference positions of the mobile computing device, wherein the reference position of the mobile computing device is included in the plurality of previously determined reference positions;
determine a subset of the plurality of previously determined reference positions, wherein each determined reference position form the subset is located within a threshold distance from an updated current position of the mobile computing device; and
output, for display, a graphical indication of one or more of the subset of the plurality of previously determined reference positions.

* * * * *

UNITED STATES PATENT AND TRADEMARK OFFICE
CERTIFICATE OF CORRECTION

| | | |
|---|---|---|
| PATENT NO. | : 8,976,063 B1 | Page 1 of 1 |
| APPLICATION NO. | : 14/285183 | |
| DATED | : March 10, 2015 | |
| INVENTOR(S) | : Hawkins et al. | |

It is certified that error appears in the above-identified patent and that said Letters Patent is hereby corrected as shown below:

In the Claims

Claim 18, column 34, line 53: delete "position form the subset is located within a" and insert --position from the subset is located within a--

Signed and Sealed this
Ninth Day of June, 2015

Michelle K. Lee
*Director of the United States Patent and Trademark Office*